(12) United States Patent
Karam et al.

(10) Patent No.: US 7,720,959 B2
(45) Date of Patent: May 18, 2010

(54) METHOD AND APPARATUS FOR CHARACTERIZING THE QUALITY OF A NETWORK PATH

(75) Inventors: Mansour J. Karam, Mountain View, CA (US); Sean P. Finn, Belmont, CA (US); Omar C. Baldonado, Palo Alto, CA (US); Michael A. Lloyd, San Carlos, CA (US); Herbert S. Madden, Tiburon, CA (US); James G. McGuire, San Francisco, CA (US)

(73) Assignee: Avaya Inc., Basking Ridge, NJ (US)

( * ) Notice: Subject to any disclaimer, the term of this patent is extended or adjusted under 35 U.S.C. 154(b) by 997 days.

(21) Appl. No.: 10/070,338

(22) PCT Filed: Oct. 17, 2001

(86) PCT No.: PCT/US01/32476

§ 371 (c)(1),
(2), (4) Date: Dec. 12, 2002

(87) PCT Pub. No.: WO02/33896

PCT Pub. Date: Apr. 25, 2002

(65) Prior Publication Data

US 2003/0161321 A1 Aug. 28, 2003

Related U.S. Application Data

(63) Continuation-in-part of application No. PCT/US01/32312, filed on Oct. 17, 2001, and a continuation-in-part of application No. PCT/US01/31259, filed on Oct. 5, 2001, and a continuation-in-part of application No. PCT/US01/31420, filed on Oct. 4, 2001, and a continuation-in-part of application No. PCT/US01/31419, filed on Oct. 4, 2001, which is a continuation-in-part of application No. 09/960,623, filed on Sep. 20, 2001, which is a continuation-in-part of application No. 09/923,924, filed on Aug. 6, 2001, now Pat. No. 7,406, 539, and a continuation-in-part of application No. 09/903,441, filed on Jul. 10, 2001, now Pat. No. 7,080, 161, and a continuation-in-part of application No. 09/903,423, filed on Jul. 10, 2001, now Pat. No. 7,363, 367.

(60) Provisional application No. 60/275,206, filed on Mar. 12, 2001, provisional application No. 60/241,450, filed on Oct. 17, 2000.

(51) Int. Cl.
*G06F 15/173* (2006.01)

(52) U.S. Cl. ...................................... 709/224; 709/238

(58) Field of Classification Search ................. 709/200, 709/223, 224, 238; 370/232, 328; 702/181–189
See application file for complete search history.

(56) References Cited

U.S. PATENT DOCUMENTS 4,284,852 A    8/1981   Szybicki et al.

(Continued)

FOREIGN PATENT DOCUMENTS

EP            0 504 537 A1    9/1992

(Continued)

OTHER PUBLICATIONS

"A Longest Prefix Match Search Engine for Multi-Gigabit IP Processing", Masayoshi Kobayashi et al., C&C Media Research Laboratories, NEC Corporation, pp. 1360-1364, 2000 IEEE.

(Continued)

*Primary Examiner*—William C. Vaughn, Jr.
*Assistant Examiner*—Greg Bengzon
(74) *Attorney, Agent, or Firm*—Sheridan Ross P.C.

(57) ABSTRACT

We describe multiple methods and apparatuses for characterizing the quality of a network path by means of metrics that at the same time are (1) additive and (2) characterize the performance of network applications.

50 Claims, 30 Drawing Sheets

U.S. PATENT DOCUMENTS

| | | | |
|---|---|---|---|
| 4,345,116 A | 8/1982 | Ash et al. | |
| 4,495,570 A | 1/1985 | Kitajima et al. | |
| 4,594,704 A | 6/1986 | Ollivier | |
| 4,669,113 A | 5/1987 | Ash et al. | |
| 4,704,724 A | 11/1987 | Krishnan et al. | |
| 4,726,017 A | 2/1988 | Krum et al. | |
| 4,748,658 A | 5/1988 | Gopal et al. | |
| 4,788,721 A | 11/1988 | Krishnan et al. | |
| 4,839,798 A | 6/1989 | Eguchi et al. | |
| 4,901,244 A * | 2/1990 | Szeto | 702/77 |
| 4,920,432 A | 4/1990 | Eggers et al. | |
| 4,931,941 A | 6/1990 | Krishnan | |
| 4,939,726 A | 7/1990 | Flammer et al. | |
| 4,949,187 A | 8/1990 | Cohen | |
| 4,949,248 A | 8/1990 | Caro | |
| 5,142,570 A | 8/1992 | Chaudhary et al. | |
| 5,172,413 A | 12/1992 | Bradley et al. | |
| 5,253,341 A | 10/1993 | Rozmanith et al. | |
| 5,271,000 A | 12/1993 | Engbersen et al. | |
| 5,287,537 A | 2/1994 | Newmark et al. | |
| 5,291,554 A | 3/1994 | Morales | |
| 5,341,477 A | 8/1994 | Pitkin et al. | |
| 5,343,463 A | 8/1994 | van Tetering et al. | 370/13 |
| 5,361,256 A | 11/1994 | Doeringer et al. | |
| 5,371,532 A | 12/1994 | Gelman et al. | |
| 5,375,070 A | 12/1994 | Hershey et al. | |
| 5,406,502 A | 4/1995 | Haramaty et al. | |
| 5,410,343 A | 4/1995 | Coddington et al. | |
| 5,414,455 A | 5/1995 | Hooper et al. | |
| 5,442,389 A | 8/1995 | Blahut et al. | |
| 5,442,390 A | 8/1995 | Hooper et al. | |
| 5,442,749 A | 8/1995 | Northcutt et al. | |
| 5,452,294 A | 9/1995 | Natarajan | |
| 5,467,345 A | 11/1995 | Cutler, Jr. et al. | |
| 5,471,622 A | 11/1995 | Eadline | |
| 5,471,623 A | 11/1995 | Napolitano, Jr. | 395/200.03 |
| 5,475,615 A | 12/1995 | Lin | |
| 5,477,536 A | 12/1995 | Picard | |
| 5,508,732 A | 4/1996 | Bottomley et al. | |
| 5,514,938 A | 5/1996 | Zaaijer et al. | |
| 5,515,511 A | 5/1996 | Nguyen et al. | |
| 5,519,435 A | 5/1996 | Anderson | |
| 5,521,591 A | 5/1996 | Arora et al. | |
| 5,528,281 A | 6/1996 | Grady et al. | |
| 5,535,195 A | 7/1996 | Lee | 370/54 |
| 5,537,394 A | 7/1996 | Abe et al. | 370/17 |
| 5,563,875 A | 10/1996 | Hefel et al. | |
| 5,574,938 A | 11/1996 | Bartow et al. | 395/800 |
| 5,590,126 A | 12/1996 | Mishra et al. | 370/329 |
| 5,629,930 A | 5/1997 | Beshai et al. | |
| 5,631,897 A | 5/1997 | Pacheco et al. | |
| 5,636,216 A | 6/1997 | Fox et al. | |
| 5,652,841 A | 7/1997 | Nemirovsky et al. | 395/201 |
| 5,654,958 A | 8/1997 | Natarajan | 370/410 |
| 5,659,196 A | 8/1997 | Honda | |
| 5,659,796 A | 8/1997 | Thorson et al. | 395/200.71 |
| 5,668,800 A | 9/1997 | Stevenson | |
| 5,675,741 A | 10/1997 | Aggarwal et al. | |
| 5,729,528 A | 3/1998 | Salingre et al. | 370/230 |
| 5,754,547 A | 5/1998 | Nakazawa | |
| 5,754,639 A | 5/1998 | Flockhart et al. | |
| 5,787,253 A | 7/1998 | McCreery et al. | |
| 5,793,976 A | 8/1998 | Chen et al. | |
| 5,802,106 A | 9/1998 | Packer | |
| 5,805,594 A | 9/1998 | Kotchey et al. | |
| 5,812,528 A | 9/1998 | VanDervort | 370/235 |
| 5,826,253 A | 10/1998 | Bredenberg | |
| 5,835,710 A | 11/1998 | Nagami et al. | |
| 5,841,775 A | 11/1998 | Huang | 370/422 |
| 5,845,091 A | 12/1998 | Dunne et al. | |
| 5,884,047 A | 3/1999 | Aikawa et al. | |
| 5,892,754 A | 4/1999 | Kompella et al. | 370/236 |
| 5,935,216 A | 8/1999 | Benner et al. | 709/248 |
| 5,940,478 A | 8/1999 | Vaudreuil et al. | 379/88.18 |
| 5,944,779 A | 8/1999 | Blum | 709/201 |
| 5,974,457 A | 10/1999 | Waclawsky et al. | |
| 6,006,264 A | 12/1999 | Colby et al. | |
| 6,009,081 A | 12/1999 | Wheeler et al. | |
| 6,012,088 A | 1/2000 | Li et al. | 709/219 |
| 6,026,441 A | 2/2000 | Ronen | |
| 6,034,946 A * | 3/2000 | Roginsky et al. | 370/238 |
| 6,052,718 A | 4/2000 | Gifford | 709/219 |
| 6,064,946 A * | 5/2000 | Beerends | 702/57 |
| 6,069,889 A | 5/2000 | Feldman et al. | |
| 6,078,953 A | 6/2000 | Vaid et al. | |
| 6,078,963 A | 6/2000 | Civanlar et al. | 709/238 |
| 6,085,238 A | 7/2000 | Yuasa et al. | |
| 6,108,703 A | 8/2000 | Leighton et al. | |
| 6,111,881 A | 8/2000 | Soncodi | 370/395 |
| 6,119,235 A | 9/2000 | Vaid et al. | |
| 6,130,890 A | 10/2000 | Leinwand et al. | |
| 6,167,052 A | 12/2000 | McNeill et al. | |
| 6,173,324 B1 | 1/2001 | D'Souza | |
| 6,178,448 B1 * | 1/2001 | Gray et al. | 709/224 |
| 6,185,598 B1 | 2/2001 | Farber et al. | |
| 6,185,601 B1 | 2/2001 | Wolff | 709/203 |
| 6,189,044 B1 | 2/2001 | Thomson et al. | 709/242 |
| 6,226,226 B1 | 5/2001 | Lill et al. | |
| 6,226,266 B1 * | 5/2001 | Galand et al. | 370/235 |
| 6,275,470 B1 | 8/2001 | Ricciulli | |
| 6,282,562 B1 | 8/2001 | Sidi et al. | |
| 6,286,045 B1 | 9/2001 | Griffiths et al. | |
| 6,292,832 B1 | 9/2001 | Shah et al. | 709/226 |
| 6,311,144 B1 * | 10/2001 | Abu El Ata | 703/2 |
| 6,317,118 B1 | 11/2001 | Yoneno | |
| 6,317,778 B1 | 11/2001 | Dias et al. | 709/214 |
| 6,317,792 B1 | 11/2001 | Mundy et al. | |
| 6,339,595 B1 | 1/2002 | Rekhter et al. | |
| 6,341,309 B1 | 1/2002 | Vaid et al. | |
| 6,363,332 B1 * | 3/2002 | Rangarajan et al. | 702/185 |
| 6,385,198 B1 | 5/2002 | Ofek et al. | 370/389 |
| 6,385,643 B1 | 5/2002 | Jacobs et al. | 709/203 |
| 6,393,486 B1 | 5/2002 | Pelavin et al. | |
| 6,415,323 B1 | 7/2002 | McCanne et al. | |
| 6,426,955 B1 | 7/2002 | Gossett Dalton, Jr. et al. | 370/401 |
| 6,430,160 B1 * | 8/2002 | Smith et al. | 370/252 |
| 6,434,606 B1 | 8/2002 | Borella et al. | |
| 6,438,592 B1 | 8/2002 | Killian | |
| 6,446,028 B1 | 9/2002 | Wang | 702/186 |
| 6,452,950 B1 | 9/2002 | Ohlsson et al. | |
| 6,453,356 B1 | 9/2002 | Sheard et al. | 709/231 |
| 6,463,454 B1 | 10/2002 | Lumelsky et al. | |
| 6,493,353 B2 | 12/2002 | Kelly et al. | 370/467 |
| 6,522,627 B1 | 2/2003 | Mauger | 370/230 |
| 6,526,056 B1 | 2/2003 | Rekhter | |
| 6,538,416 B1 | 3/2003 | Hahne et al. | 320/431 |
| 6,549,954 B1 | 4/2003 | Lambrecht et al. | |
| 6,553,423 B1 | 4/2003 | Chen | |
| 6,556,582 B1 | 4/2003 | Redi | 370/443 |
| 6,560,204 B1 * | 5/2003 | Rayes | 370/253 |
| 6,584,093 B1 | 6/2003 | Salama et al. | |
| 6,594,268 B1 | 7/2003 | Aukia et al. | |
| 6,594,307 B1 * | 7/2003 | Beerends | 375/224 |
| 6,594,692 B1 | 7/2003 | Reisman | |
| 6,601,098 B1 | 7/2003 | Case et al. | |
| 6,601,101 B1 | 7/2003 | Lee et al. | 709/227 |
| 6,608,841 B1 | 8/2003 | Koodli | |
| 6,611,872 B1 | 8/2003 | McCanne | |
| 6,614,789 B1 | 9/2003 | Yazdani et al. | 370/392 |
| 6,625,648 B1 | 9/2003 | Schwaller et al. | |
| 6,631,419 B1 | 10/2003 | Greene | |
| 6,633,640 B1 | 10/2003 | Cohen et al. | |
| 6,633,878 B1 | 10/2003 | Underwood | |

| | | | |
|---|---|---|---|
| 6,658,000 B1 | 12/2003 | Raciborski et al. | |
| 6,661,797 B1 * | 12/2003 | Goel et al. | 370/395.21 |
| 6,665,271 B1 | 12/2003 | Thomas et al. | |
| 6,665,725 B1 | 12/2003 | Dietz et al. | |
| 6,687,229 B1 * | 2/2004 | Kataria et al. | 370/238 |
| 6,704,768 B1 | 3/2004 | Zombek et al. | 709/201 |
| 6,704,795 B1 | 3/2004 | Fernando et al. | |
| 6,707,824 B1 | 3/2004 | Achilles et al. | 370/412 |
| 6,711,137 B1 * | 3/2004 | Klassen et al. | 370/252 |
| 6,711,152 B1 | 3/2004 | Kalmanek, Jr. et al. | 370/351 |
| 6,714,549 B1 | 3/2004 | Phaltankar | |
| 6,714,896 B1 * | 3/2004 | Barrett | 702/189 |
| 6,728,484 B1 | 4/2004 | Ghani | 398/42 |
| 6,728,777 B1 | 4/2004 | Lee et al. | |
| 6,728,779 B1 | 4/2004 | Griffin et al. | 709/239 |
| 6,735,177 B1 | 5/2004 | Suzuki | 370/238 |
| 6,748,426 B1 | 6/2004 | Shaffer et al. | |
| 6,751,562 B1 | 6/2004 | Blackett et al. | 702/61 |
| 6,751,661 B1 | 6/2004 | Geddes | |
| 6,751,664 B1 | 6/2004 | Kogan et al. | |
| 6,757,255 B1 | 6/2004 | Aoki et al. | 370/252 |
| 6,760,775 B1 | 7/2004 | Anerousis et al. | 709/238 |
| 6,760,777 B1 | 7/2004 | Agarwal et al. | 709/238 |
| 6,766,381 B1 | 7/2004 | Barker et al. | |
| 6,771,646 B1 | 8/2004 | Sarkissian et al. | |
| 6,785,704 B1 | 8/2004 | McCanne | |
| 6,795,399 B1 * | 9/2004 | Benmohamed et al. | 370/235 |
| 6,795,860 B1 | 9/2004 | Shah | 709/229 |
| 6,801,502 B1 | 10/2004 | Rexford et al. | 370/235 |
| 6,810,417 B2 | 10/2004 | Lee | 709/220 |
| 6,819,662 B1 | 11/2004 | Grover et al. | 370/351 |
| 6,820,133 B1 | 11/2004 | Grove et al. | 709/238 |
| 6,826,613 B1 | 11/2004 | Wang et al. | 709/227 |
| 6,829,221 B1 | 12/2004 | Winckles et al. | 370/238 |
| 6,829,654 B1 | 12/2004 | Jungck | |
| 6,836,463 B2 * | 12/2004 | Garcia-Luna-Aceves et al. | 370/238 |
| 6,839,745 B1 | 1/2005 | Dingari et al. | 709/219 |
| 6,839,751 B1 | 1/2005 | Dietz et al. | 709/224 |
| 6,862,618 B1 * | 3/2005 | Gray et al. | 709/224 |
| 6,873,600 B1 | 3/2005 | Duffield et al. | |
| 6,885,641 B1 * | 4/2005 | Chan et al. | 370/252 |
| 6,894,991 B2 | 5/2005 | Ayyagari et al. | 370/325 |
| 6,897,684 B2 | 5/2005 | Oi et al. | |
| 6,909,700 B1 * | 6/2005 | Benmohamed et al. | 370/255 |
| 6,912,203 B1 | 6/2005 | Jain et al. | |
| 6,912,222 B1 | 6/2005 | Wheeler et al. | 370/395.31 |
| 6,920,134 B2 | 7/2005 | Hameleers et al. | |
| 6,956,858 B2 | 10/2005 | Hariguchi et al. | 370/395.31 |
| 6,963,575 B1 | 11/2005 | Sistanizadeh et al. | 370/404 |
| 6,963,914 B1 | 11/2005 | Breitbart et al. | 709/224 |
| 6,973,490 B1 | 12/2005 | Robertson et al. | 709/224 |
| 6,981,055 B1 | 12/2005 | Ahuja et al. | 709/238 |
| 6,993,584 B2 | 1/2006 | Border et al. | 709/227 |
| 6,999,432 B2 * | 2/2006 | Zhang et al. | 370/328 |
| 7,002,917 B1 * | 2/2006 | Saleh | 370/238 |
| 7,020,086 B2 * | 3/2006 | Juttner et al. | 370/238 |
| 7,024,475 B1 * | 4/2006 | Abaye et al. | 709/224 |
| 7,043,541 B1 | 5/2006 | Bechtolsheim et al. | 709/223 |
| 7,043,562 B2 | 5/2006 | Dally et al. | 709/238 |
| 7,046,653 B2 | 5/2006 | Nigrin et al. | |
| 7,065,584 B1 * | 6/2006 | Shavitt et al. | 709/241 |
| 7,080,161 B2 | 7/2006 | Leddy et al. | |
| 7,085,230 B2 * | 8/2006 | Hardy | 370/232 |
| 7,099,282 B1 * | 8/2006 | Hardy | 370/252 |
| 7,107,326 B1 | 9/2006 | Fijolek et al. | |
| 7,110,393 B1 | 9/2006 | Tripathi et al. | 370/352 |
| 7,111,073 B1 * | 9/2006 | Jain et al. | 709/241 |
| 7,123,620 B1 | 10/2006 | Ma | 370/395.32 |
| 7,139,242 B2 | 11/2006 | Bays | 370/238 |
| 7,155,436 B2 | 12/2006 | Hegde et al. | 707/10 |
| 7,162,539 B2 | 1/2007 | Garcie-Luna-Aceves | 709/242 |
| 7,269,157 B2 | 9/2007 | Klinker et al. | 370/351 |
| 7,343,422 B2 | 3/2008 | Garcia-Luna-Aceves et al. | |
| 7,349,994 B2 | 3/2008 | Balonado et al. | |
| 7,363,367 B2 | 4/2008 | Lloyd et al. | |
| 7,406,539 B2 | 7/2008 | Baldonado et al. | |
| 7,472,192 B2 | 12/2008 | DeFerranti et al. | |
| 7,487,237 B2 | 2/2009 | Lloyd et al. | |
| 2001/0010059 A1 | 7/2001 | Burman et al. | 709/224 |
| 2001/0026537 A1 | 10/2001 | Massey | 370/316 |
| 2001/0037311 A1 | 11/2001 | McCoy et al. | |
| 2002/0038331 A1 | 3/2002 | Flavin | |
| 2002/0062388 A1 | 5/2002 | Ogier et al. | |
| 2002/0087687 A1 | 7/2002 | Zaifman et al. | 709/225 |
| 2002/0101821 A1 | 8/2002 | Feldmann et al. | 370/232 |
| 2002/0124100 A1 | 9/2002 | Adams | |
| 2002/0152318 A1 | 10/2002 | Menon et al. | 709/231 |
| 2002/0184527 A1 | 12/2002 | Chun et al. | 713/201 |
| 2003/0016770 A1 | 1/2003 | Trans et al. | |
| 2003/0039212 A1 | 2/2003 | Lloyd et al. | 370/235 |
| 2003/0112788 A1 | 6/2003 | Erhart et al. | 370/345 |
| 2003/0163555 A1 | 8/2003 | Battou et al. | |
| 2004/0030776 A1 | 2/2004 | Cantrell et al. | 709/224 |
| 2004/0062267 A1 | 4/2004 | Minami et al. | 370/463 |
| 2004/0218546 A1 * | 11/2004 | Clark | 370/252 |
| 2005/0044270 A1 | 2/2005 | Grove et al. | 709/238 |
| 2005/0083912 A1 | 4/2005 | Afshar et al. | 370/352 |
| 2005/0132060 A1 | 6/2005 | Mo et al. | 709/227 |
| 2005/0185654 A1 | 8/2005 | Zadikian et al. | 370/395.21 |
| 2005/0201302 A1 | 9/2005 | Gaddis et al. | 370/254 |
| 2005/0243726 A1 | 11/2005 | Narendran | 370/238 |
| 2006/0026682 A1 | 2/2006 | Zakas | 726/22 |
| 2006/0036763 A1 | 2/2006 | Johnson et al. | 709/238 |
| 2006/0291446 A1 | 12/2006 | Caldwell et al. | |
| 2007/0064715 A1 | 3/2007 | Lloyd et al. | |
| 2007/0115840 A1 | 5/2007 | Feick et al. | |
| 2007/0271066 A1 * | 11/2007 | Nikitin et al. | 702/181 |
| 2008/0089241 A1 | 4/2008 | Lloyd et al. | |
| 2008/0101793 A1 | 5/2008 | Koch et al. | 398/1 |
| 2008/0186877 A1 | 8/2008 | Balonado et al. | |
| 2009/0006647 A1 | 1/2009 | Balonado et al. | |
| 2009/0031025 A1 | 1/2009 | Lloyd et al. | |

FOREIGN PATENT DOCUMENTS

| | | |
|---|---|---|
| EP | 0 528 075 A1 | 2/1993 |
| EP | 0 788 267 A2 | 8/1997 |
| EP | 0 598 969 B1 | 2/1999 |
| EP | 0 942 560 A2 | 9/1999 |
| EP | 0 982 901 A1 | 1/2000 |
| EP | 0 977 456 A2 | 2/2000 |
| EP | 0 999 674 A1 | 4/2004 |
| FR | 2806862 | 9/2001 |
| JP | 2000/312226 | 11/2000 |
| WO | WO 94/08415 | 4/1994 |
| WO | WO 99/06913 | 2/1999 |
| WO | WO 99/14907 | 3/1999 |
| WO | WO 99/14931 | 3/1999 |
| WO | WO 99/14932 | 3/1999 |
| WO | WO 99/18751 | 4/1999 |
| WO | WO 99/30460 | 6/1999 |
| WO | WO 99/39481 | 8/1999 |
| WO | WO 00/04458 | 1/2000 |
| WO | WO 00/25224 | 5/2000 |
| WO | WO 00/38381 | 6/2000 |
| WO | WO 00/45560 | 8/2000 |
| WO | WO 00/52906 | 9/2000 |
| WO | WO 00/62489 | 10/2000 |
| WO | WO 00/72528 A1 | 11/2000 |
| WO | WO 00/79362 A2 | 12/2000 |
| WO | WO 00/79730 A2 | 12/2000 |
| WO | WO 01/06717 A1 | 1/2001 |
| WO | WO 01/13585 A1 | 2/2001 |
| WO | WO 02/033892 | 4/2002 |

| | | |
|---|---|---|
| WO | WO 02/033894 | 4/2002 |
| WO | WO 02/033896 | 4/2002 |
| WO | WO 02/033915 | 4/2002 |
| WO | WO 02/033916 | 4/2002 |

OTHER PUBLICATIONS

Z. Wang et al., "Resource Allocation for Elastic Traffic: Architecture and Mechanisms," Conference Proceedings Article, 2000, XP010376681, pp. 159-169.

C. V. Papadopoulos et al., "Protection and Routing Algorithms for Network Management—The Case of Transmission Networks," Microprocessing and Microprogramming 38 (1993), XP000383771, pp. 163-170.

J. Yu, "Scalable Routing Design Principles," Ref. No. RFC 2791, Network Working Group, Jul. 31, 2000, pp. 1-26.

Paul Francis et al., "An Architecture for a Global Internet Host Distance Estimation Service," pp. 1-17.

T. Bates et al., "Multiprotocol Extensions for BGP-4", XP-00219077, Jun. 2000, ppg. 1-10.

S. Kumar et al., "The MASC/BGMP Architecture for Inter-domain Multicast Routing," 12 pages.

S. Berson et al., "An Architecture for Advance Reservations in the Internet," USC Information Sciences Institute, Jul. 16, 1998, pp. 1-21.

R. P. Draves et al., "Constructing Optimal IP Routing Tables," 1999 IEEE, 1-10.

R. Govindan et al., "An Analysis of Internet Inter-Domain Topology and Route Stability," USC Information Sciences Institute, 1997 IEEE, 8 pages.

Nick Feamster et al., "Controlling the Impact of BGP Policy Changes on IP Traffic", Nov. 6, 2001, pp. 1-18.

Dean Jones, "Developing Shared Ontologies in Multi-Agent Systems", pp. 1-10.

L. Massoulie et al., "Arguments in favour of admission control for TCP flows", pp. 1-16.

Murthy, Shree, et al, "A loop-free routing protocol for large-scale internets using distance vectors,"Mar. 14, 2007, pp. 147-161, Computer Communications.

Bouloutas, A. et al, "Some Graph Partitioning Problems and Algorithms Related to Routing in Large Computer Networks," International Conference on Distributed Computing Systems, Newport Beach, Jun. 5-9, 1989, pp. 362-370, Washington, IEEE Comp. Soc. Press, US.

Yositsugu, Ohmae et al, "Dividing Method for Topological Design of Corporate Communication Networks," Aug. 1, 1992, pp. 54-62, Communications, Wiley Hoboken ,NJ, US.

D. New, "RFC 3620, The TUNNEL Profile," Oct. 2003, The Internet Society.

V. Paxson, "Toward a Framework for Defining Internet Performance Metrics," http://www.isoc.org/inet96/proceedings/d3/d3_3.htm, pp. 1-20.

C. Alaettinoglu et al. "Routing Policy Specification Language (RPSL)," http://quimby.gnus.org/internet-drafts/draft-ietf-rps-rpsl-v2-00.txt, pp. 1-56.

P. Traina, "BGP-4 Protocol Analysis," Mar. 1995, pp. 1-10.

B. Krishnamurthy et al., "On Network-Aware Clustering of Web Clients," 14 pages.

Sami Iren et al., "The.Transport Layer: Tutorial and Survey", XP-002210446, ACM Computing Surveys, vol. 31, No. 4, Dec. 1999, pp. 360-405.

D. B. Ingham et al., "Supporting Highly Manageable Web Services", Computer Networks and ISDN Systems 29 (1997), pp. 1405-1416.

"Internet Protocol" from Nortel Networks, www.arvelo.net/net-bay-ip.html. Apr. 6, 2005, 26 pages.

A. Feldmann et al., "Deriving Traffic Demands for Operational IP Networks: Methodology and Experience", pp. 1-14, date unknown.

Francis, Paul, et a', "An Architecture for a Global Internet Host Distance Estimation Service," 1999, pp. 210-217, IEEE.

Nikolaos Skarmeas ct al., "Intelligent Routine Based on Active Patterns as the Basis for the Integration of Distributed Information Systems", Department of Computing Imperial College London, Feb. 1997, pp. 1-12.

Nikolaos Skarrneas et al., "Content Based Routing as the Basis for Intra-Agent Communication", Jan. 1998, Department of Computing Imperial College London.

R. Govindan et al., "Heuristics for Internet Map Discovery", USC/Information Sciences Institute, pp. 1-11, 2000.

Savage, et al., "Practical Network Support for IP Traceback", SIGCOMM, 2000, available at http://www-cse.ucsd.edu/~savage/papers/Sigcomm00.pdf, pp. 1-12.

Yasushi Saito et al., "Manageability, Availability and Performance in Porcupine: A Highly Scalable, Cluster-Based Mail Service", 17th ACM Symposium on Operating ystcrn rinciples, pp. 1-15, Dec. 1999.

Background of the invention for the above captioned application (previously provided).

* cited by examiner (a)

(b)

(a)

(b)

(a)

(b)

(a)

(b)

(a)

(b)

(a)

(b)

METHOD AND APPARATUS FOR CHARACTERIZING THE QUALITY OF A NETWORK PATH

CROSS REFERENCE TO RELATED APPLICATION

This application is (a) the National Stage of PCT Application No. PCT/US01/32476, filed Oct. 17, 2001; and is a continuation-in-part of (b) PCT Application No. PCT/US01/32312, filed Oct. 17, 2001; (c) PCT Application No. PCT/US01/31259, filed Oct. 5, 2001; (d) PCT Application No. PCT/US01/31420, filed Oct. 4, 2001; and (e) PCT Application No. PCT/US01/31419, filed Oct. 4, 2001; which (a), (b), (c), (d) and (e) are continuations-in-part of (i) U.S. application Ser. No. 09/960,623, filed Sep. 20, 2001; (ii) U.S. application Ser. No. 09/903,423, filed Jul. 10, 2001 now U.S. Pat. No. 7,363,367; (iii) U.S. application Ser. No. 09/923,924, filed Aug. 6, 2001 now U.S. Pat. No. 7,406,539; and (iv) U.S. application Ser. No. 09/903,441, filed Jul. 10, 2001 now U.S. Pat. No. 7,080,161; which (i), (ii), (iii) and (iv) claim the benefit of (1) U.S. Provisional Application No. 60/275,206, filed Mar. 12, 2001; and (2) U.S. Provisional Application Ser. No. 60/241,450, filed Oct. 17, 2000. These applications are hereby incorporated by reference.

FIELD

The invention relates generally to paths of one or more computer networks, and particularly relates to metrics characterizing the network paths.

BACKGROUND

The use of efficient routing algorithms, such as the bellman-ford algorithm and the open shortest path (OSP) algorithm is highly desirable in complex networks. Until today, these algorithms use metrics that are mostly static, and that are based on very coarse approximations of path performance quality (e.g., number of hops, user-defined static costs that are associated to each of the links in the network). As the Internet becomes more and more ubiquitous, metrics that characterize the quality of network applications running across network paths become more important. Metrics for voice and video have been devised in the past; however these metrics are complex and not adapted for routing, and instead can be used to report performance at select points in the network.

SUMMARY

Metrics that at the same time are (1) additive and (2) characterize the performance of network applications are highly desirable, as they allow routing algorithms and devices that can take into account factors that matter to the users of these applications.

We describe multiple methods and apparatuses for characterizing the quality of a network path by means of a metric. This metric characterizes a plurality of one or more network applications running across a network path. The quality characterization characterizes a quality of the same plurality of one or more network applications running at one or more end-points of the path. This metric is at least a function of a plurality of one or more elementary network parameters. The plurality of one or more network parameters include one or more of delay, jitter, loss, currently available bandwidth, and intrinsic bandwidth.

This metric is also additive, in the sense that given a network path that includes a first segment and a second segment, the metric score across the network path is equal to the sum of the metric score across the first segment, and the metric score across the second segment.

Additional features, benefits, and embodiments of the present invention will become apparent from the detailed description, figures and claims.

DETAILED DESCRIPTION

We describe multiple embodiments of a method that translates elementary network parameters, wherein the plurality of one or more network parameters include one or more of delay, jitter, loss, currently available bandwidth, and intrinsic bandwidth into a metric that measures, at least in part quality characterizations of a same plurality of one or more network applications, wherein the quality characterization characterizes a quality of the same plurality of one or more network applications user-perceived quality metrics. In some embodiments of this invention, this metric captures the user-perceived experience of the performance of an application. This metric is additive, in the sense that given:

a network path, including a first segment and a second segment;

a first metric and the second metric, which are at least in part quality characterizations of a same plurality of one or more network applications, wherein the quality characterization characterizes a quality of the same plurality of one or more network applications running at one or more segment end-points wherein the first metric and the second metric are at least partly a function of a same plurality of one or more elementary network parameters, wherein the plurality of one or more network parameters include one or more of delay, jitter, loss, currently available bandwidth, and intrinsic bandwidth wherein the first metric is at least partly the function of the same plurality of elementary network parameters of the first segment, wherein the one or more segment end points include one or more end-points of the first segment wherein the second metric is at least partly the function of the same plurality of elementary network parameters of the second segment, wherein the one or more segment end points include one or more end-points of the second segment, adding the first metric and the second metric generates a third metric, wherein the third metric is at least partly the function of the same plurality of one or more elementary network parameters of the network path, wherein the one or more segment end points include one or more end-points of the network path the third metric is a quality characterization of a same plurality of one or more applications In the process of designing such a metric, we first describe the insight that drives the general methodology, as well as the methodology specifics for voice, video, TCP traffic, HTTP/1.0, and HTTP/1.1 respectively. Applying the described technique for voice, video, and data traffic, we derive embodiments of such an application specific metric for each type of application independently.

General Methodology

Figure 2:
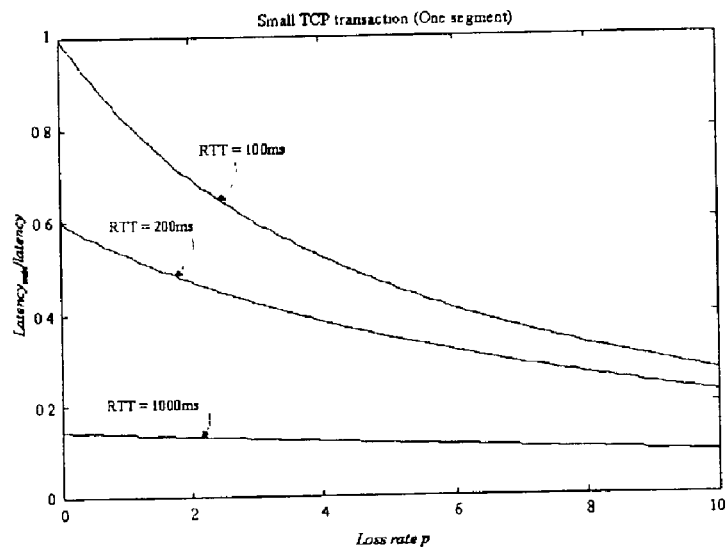
FIG. 2 short TCP connections: performance degradation $(Latency_{min}/Latency)$ of some embodiments versus (a) the loss rate and (b) RTT.
Figure 2:
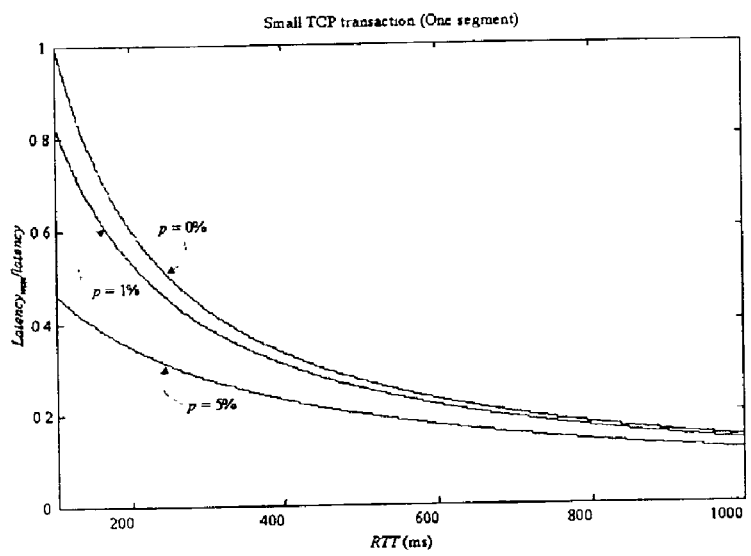
Figure 3:
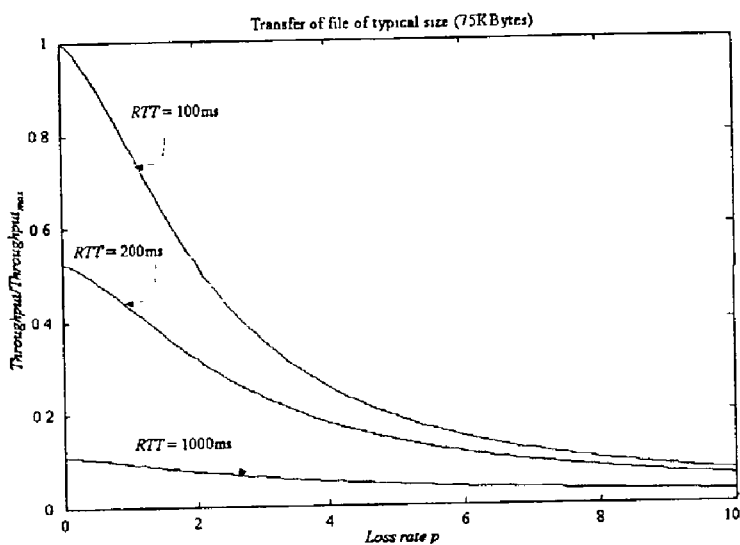
FIG. 3 typical file transfer: performance degradation $(Throughput/Throughput_{max})$ of some embodiments versus (a) the loss rate and (b) RTT.
Figure 3:
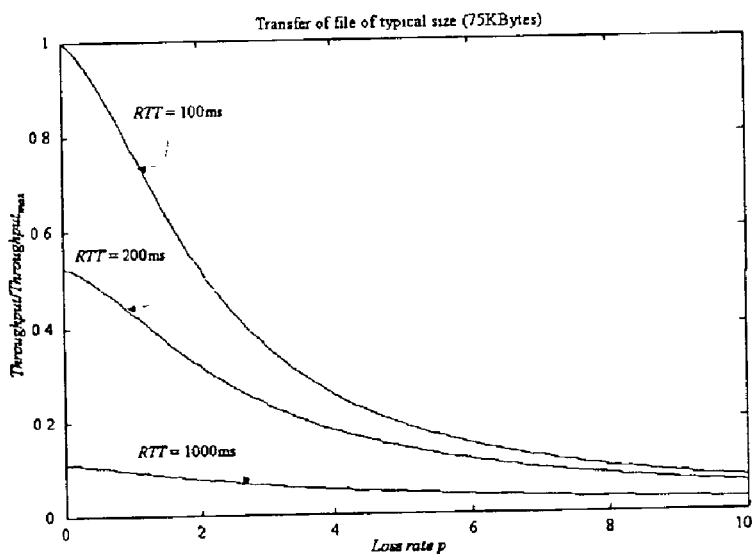

Let's look at the general shape of performance degradation versus delay and loss curves for voice and TCP data traffic, where performance means the performance metric that matters for the respective application: MOS score for voice traffic, throughput and latency for TCP data traffic. (See FIGS. 1-3.)

In some embodiments of this invention, these curves are normalized. Normalizing the performance curves includes translating them to a 0-1 performance score, where 1 represents no degradation, whereas 0 represents total degradation. Other embodiments can use other scales such as inverted scales from 1-0 and/or different scales such as 0-10. For example, in some embodiments of this invention, in one embodiment of the voice application, a MOS (Mean Opinion Score) of 4 is converted to a metric of 1 for voice (since 4 is the maximum that can be attained in a telephone system), whereas a MOS score of 1 maps to a metric of 0 (that is, total degradation). On the other hand, in some embodiments of this invention, for general TCP applications, it is assumed that a metric of 1 for short TCP transactions translates into a fast, reliable response, whereas a metric of 0 represents "infinitely" slow response. Finally, in some embodiments of this invention, for TCP file transfer, a metric of 1 corresponds to a high throughput, while a metric of 0 corresponds to a throughput that is close to 0. Note that in the context of TCP, a loss rate of 0 is a physically plausible phenomenon that gives the benchmark performance in terms of latency and throughput to which the performance achieved over lossy paths can be compared to. On the other hand, for some embodiments of this invention, a round-trip time of zero is less realistic, and leads in one embodiment with TCP traffic to both infinite throughput and zero latency as long as the loss rate is less than 100%. Hence, in some embodiments of this invention, the round-trip time for which the benchmark latency and throughput measures are computed, $RTT_0$ is larger than 0, and can be chosen according to the characteristics of the particular system in consideration. In some embodiments, the internetwork considered includes national networks spanning large geographical areas; in this context, a one-way delay of less than 25 ms is uncommon. Hence, in such embodiments, a $RTT_0$=50 ms can be appropriate. In some embodiments, the choice of $RTT_0$ is significant, since different values of $RTT_0$ lead to different shapes for the curves in FIG. 2b and FIG. 3b, which in turn lead to different metric parameters.

The shape these curves is very similar between many embodiments. In some embodiments, the curves corresponding to voice (FIG. 1) have a shape that can be approximated by a negative exponential. In some embodiments, the curves corresponding to TCP applications (FIGS. 2-3) are hyperbolic in p and RTT, in some embodiments of this invention, a hyperbolic function can be approximated, for a portion of the parameters' ranges with an exponential function. The related issues are dealt with later in the appendix, in the section reserved for TCP applications.

In some embodiments, it is assumed that these curves can be fitted by negative exponential functions in some portion of the parameters' ranges. In some embodiments, in both the case of voice and data traffic, it is also assumed that one-way delay is half the round-trip time delay, so performance degradation versus one-way delay curves can be obtained. The same theory can apply to embodiments of voice and/or TCP traffic. For simplicity, in the remainder of this section, we describe an embodiment in the context of voice traffic. Hence, in this embodiment, the following equations estimate performance degradation versus one-way delay and loss, $m_{vd}$ and $m_{vl}$, respectively, corresponding to voice traffic:

$$m_{vD}=\exp(-\alpha_v D)$$

$$m_{vl}=\exp(-\beta_v l)$$

Delay-loss MOS contours have not, to the extent of our knowledge, been studied extensively in previous subjective studies of voice quality. Hence, in some embodiments, assumptions are made in the way a metric $m_v$ combining $m_{vD}$ and $m_{vl}$ can be obtained from both metrics' equations. In one embodiment, one intuitively appealing technique that can be used to combine $m_{vD}$ and $m_{vl}$ can be used. Given the equations above, performance is close to perfect when both $m_{vD}$ and $m_{vl}$ are close to 1. That is, we have $$(m_{vD}=1 \text{ and } m_{vl}=1) \Rightarrow m_v=1$$

On the other hand, note that if either $m_{vD}$ or $m_{vl}$ are close to 0, then the quality as perceived by the user will be bad, i.e., $m_v$ must be close to 0. Hence, the second relation between $m_{vD}$, $m_{vl}$ and $m_v$ ought to be $$(m_{vD}=0 \text{ or } m_{vl}=0) \Rightarrow m_v=0$$

One operator that satisfies both relations above is ×. In this embodiment, we use this operator; the resulting metric for voice becomes $$m_v=m_{vD} \times m_{vl}=\exp(-\alpha_v D) \times \exp(-\beta_v l)=\exp(-\alpha_v D-\beta_v l)$$

Figure 4:
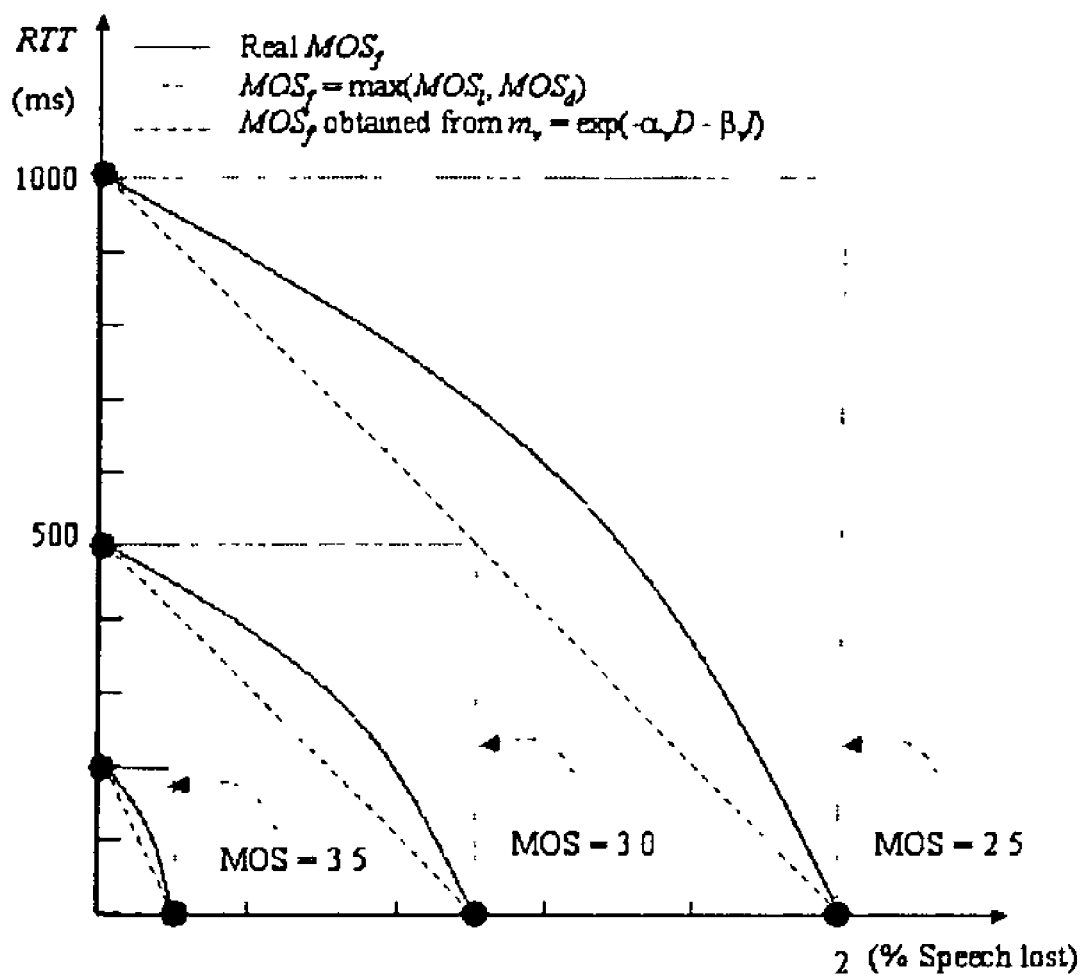
FIG. 4 MOS contours of some embodiments versus RTT and % speech lost.

According to the obtained metric, equal metric contours in the (D, l) plane are straight lines (See FIG. 4.)

Note that since the exponential function is monotonic, the metric is also additive, in the sense described above, (which we denote MS in this document) is equal to $$\text{metric} = D + \frac{\beta_v}{\alpha_v} l$$

Defining $\delta_v$ to be equal to $\beta_v/\alpha_v$, we get $$\text{metric}=D+\delta_v l$$

In this embodiment, the metric has two properties: on one hand, it can be simply modified using a single parameter $\delta_v$.

Figure 30:
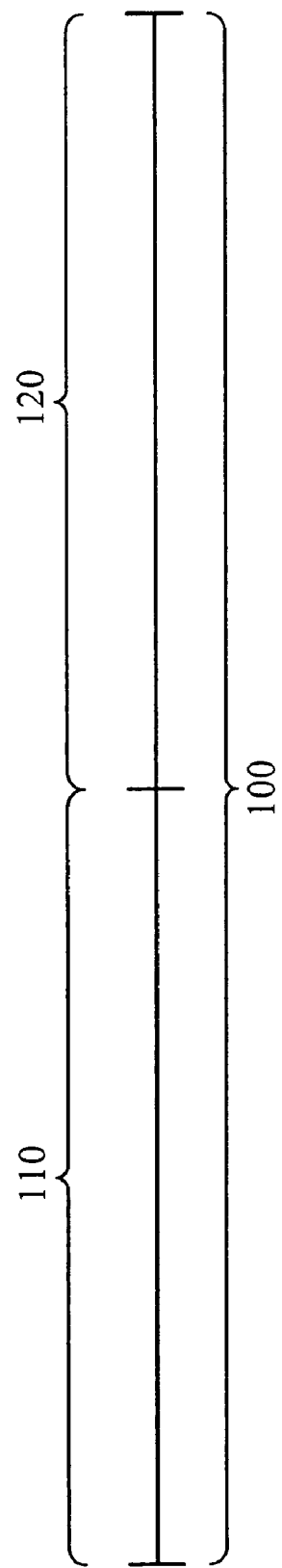
FIG. 30 shows two segments or links that together form a network path.

FIG. 30 shows a network path 100 that includes a first segment 110 and a second segment 120 (Other embodiments can use more than one parameter.) On the other hand, it is additive, in the sense described above. This characteristic can be useful in the context of routing; specifically, in some embodiments, this metric can be used for routing, using algorithms such as Distance Vector and SPF (Shortest Path First). That is, using such a metric, dogleg routing can be easily implemented. In the following, we justify this property in the context of this specific embodiment: assume a path includes two links, $L_1$ and $L_2$. The one-way delay and loss across link $L_1$ are denoted $D_1$ and $l_1$, while the delay and loss across link $L_2$ are denoted $D_2$ and $l_2$, respectively. We also define $metric_1$ and $metric_2$ to be the resulting metrics on link $L_1$ and link $L_2$, respectively, while the total metric is set to $metric_1$+$metric_2$=$D_1$+$D_2$+$\delta_v(l_1+l_2)$. In this particular example, we use the one-way delay equation $$D_i=d_i+4\hat{v}_i, i=1, 2$$

Clearly, D=$D_1$+$D_2$ is only an approximation of the delay on the link since in some embodiments, jitter is not additive. However, in some embodiments, the total jitter across a path is smaller or equal to the sum of jitter values for all segments on the path. Hence, in these embodiments, $D_1$+$D_2$ is a higher bound on the actual delay D over the link. In other words, setting the delay for the total path to $D_1$+$D_2$, a 2 hop path is effectively penalized over a one hop path. In some embodiments, this is intuitively justifiable, since using two hops as opposed to one hop exhibits potentially extra overhead which is not taken into account by the delay metric, such as the potential additional delay incurred at the node connecting the two hops, and other reliability issues in terms of routing and connectivity. Hence, in such embodiments, it appears reasonable to penalize routes with a higher hop count.

On the same line of thought, let's derive the total loss rate on the path. In some embodiments, the losses on Links $L_1$ and $L_2$ can be assumed to occur independently; in such embodiments, then the total loss can be found using $$1-l=(1-l_1)(1-l_2)$$

$$l=l_1+l_2-l_1 l_2$$

That is, the actual loss on the path is lower than the value $l_1+l_2$ assumed by the additive nature of the metric. In fact, in embodiments where the losses on links $L_1$ and $L_2$ are correlated, the actual loss is generally lower than $l_1+l_2-l_1 l_2$. However, first note that for the range of loss rates of interest to some embodiments, (say 1-10%), $l_1 l_2$ is much smaller than $l_1$ or $l_2$ (for example, for $l_1$=10% and $l_2$=10%, then $l_1 l_2$ is a mere 1%). Hence, in such embodiments, $l_1 l_2$ can safely be ignored from the equation for 1. Furthermore, in some embodiments, the same argument can be set forth, as was made for the computation of delay, namely that penalizing the route that has a larger hop count is justifiable from a design point of view.

The arguments described above demonstrate the adequacy and practicality of the metric metric=D+δl for some embodiments. In the sections below, the theory described above, which applies to some embodiments of this invention, is used in the specific contexts of voice and TCP data traffic, respectively, leading to some embodiments of this invention for voice and TCP. In some embodiments, it is useful to have a value of δ that is adequate both for voice and TCP. In some embodiments the value of δ is common for both voice and data traffic.

Metric for Voice Traffic

Figure 1:
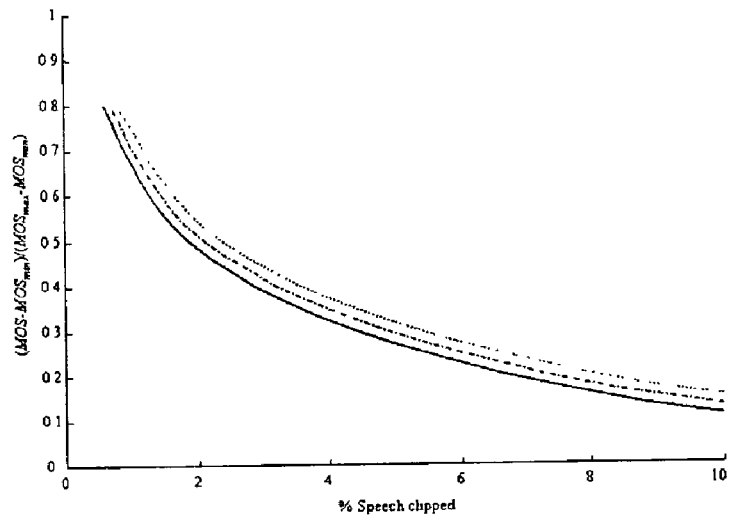
FIG. 1 voice traffic: performance degradation $(MOS-MOS_{min})/(MOS_{max}-MOS_{min})$ of some embodiments versus (a) percentage speech clipped and (b) RTT.
Figure 1:
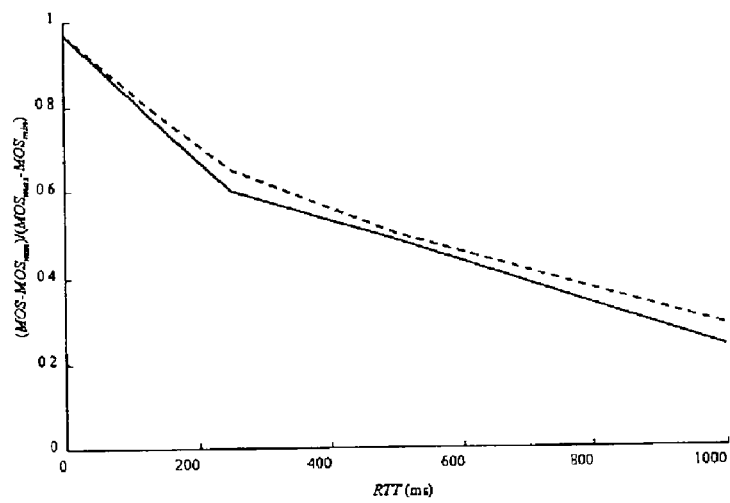
Figure 5:
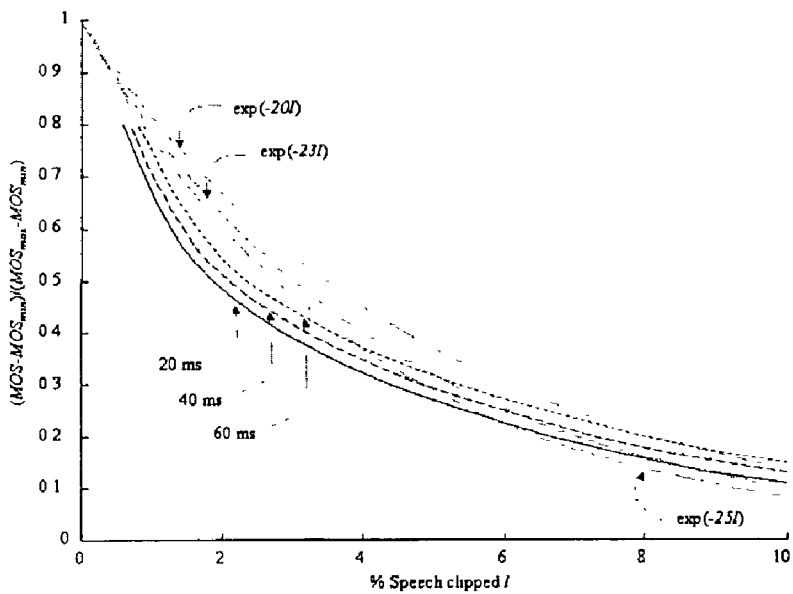
FIG. 5 normalized MOS degradation of some embodiments versus (a) speech lost and (b) one-way delay with negative exponentials.
Figure 5:
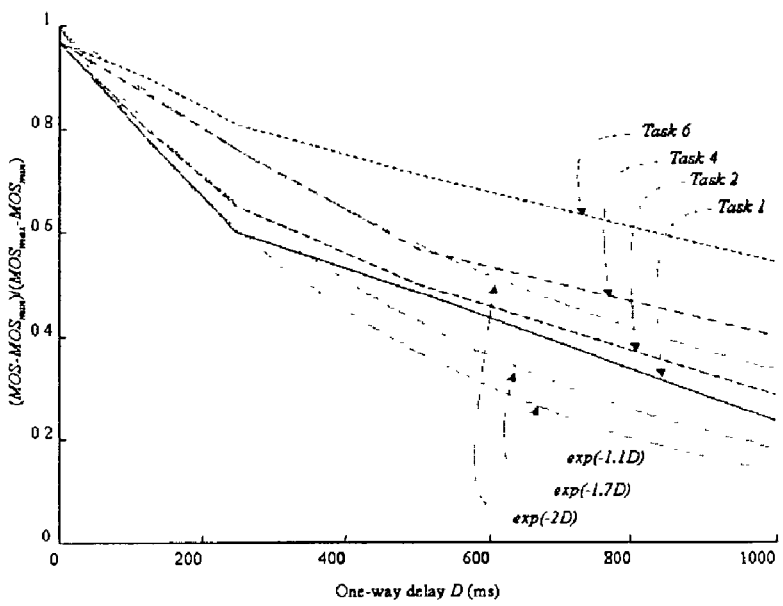

In this section, we approximate the normalized MOS degradation curves shown in FIG. 1 with negative exponentials. The results are shown in FIG. 5. Focusing first on FIG. 5a, we can see that fitting the curve with an exponential leads to either an under-estimation of the degradation for low speech loss (that is, less than 4% loss rates) or to an over-estimation of the degradation for high loss rates (e.g., 10% loss rates and above). In order to pick an appropriate fit, one must remember that the curve shown in FIG. 5a assumes no error resiliency at all. That is, a lost packet is replaced with silence. However, most modern voice decoders have features that enable some sort of error resiliency, in such a way that the effect of small clips can be significantly mitigated. As a result, one might expect that in actual modern voice encoders, the MOS degradation corresponding to low speech lost is not as high as that shown in FIG. 1a and FIG. 5a. In addition, it is clear that the efficiency of such error-resilient decoders gets lower as the packet loss increases; for loss rates exceeding 10%, no error correction can overcome the degradation caused by the amount of information lost. Hence, as shown in FIG. 5a, we fit the degradation curves with negative exponentials that under-estimate the degradation for low speech loss (that is, for values of l lower than 4%), and matches the degradation for values of l exceeding 6%. We get $$exp(-25l) \leq m_{v,l} \leq exp(-20l)$$

with an average of $$m_{v,l} = exp(-23l)$$

Similarly, we fit negative exponentials to the curves representing MOS degradation versus one-way delay D (obtained from the MOS versus RTT curves using the simple D=RTT/2 relation). (See FIG. 5b.) Here too, in some embodiments of this invention, a choice has to be made between slightly underestimating the loss for low values of delay, and over-estimating the loss for higher values of delay. In some embodiments, the curves are derived from experiments conducted in N. Kitawaki and K. Itoh, *Pure Delay Effects on Speech Quality in Telecommunications*, IEEE Journal of Selected Areas in Communications, Vol. 9, No.4, May 1991, for different tasks:

Task 1: Take turns reading random numbers aloud as quickly as possible

Task 2: Take turns verifying random numbers as quickly as possible

Task 4: Take turns verifying city names as quickly as possible

Task 6: Free conversation

In some embodiments of this invention, the experiments that involve intense interaction, such as business calls or transaction-related calls are the most relevant. For these embodiments, the metric is optimized for tasks that resemble more Tasks 1 and 2 (from N. Kitawaki and K. Itoh, *Pure Delay Effects on Speech Quality in Telecommunications*, IEEE Journal of Selected Areas in Communications, Vol. 9, No.4, May 1991, then Tasks 4 and 6. In addition, for such embodiments, a round-trip time that is larger than 500 ms (that is, one way delays larger than 250 ms) is not desirable, as it gives a sense of poor quality that is not well reflected by the low performance degradation obtained in N. Kitawaki and K. Itoh, *Pure Delay Effects on Speech Quality in Telecommunications*, IEEE Journal of Selected Areas in Communications, Vol. 9, No.4, May 1991. Thus, for such embodiments, the chosen voice negative exponential curves fit closely the results obtained in N. Kitawaki and K. Itoh, *Pure Delay Effects on Speech Quality in Telecommunications*, IEEE Journal of Selected Areas in Communications, Vol. 9, No.4, May 1991, for low values of delay (that is, for D smaller than 250 ms), and over-estimates the MOS degradation for values of D that are larger than 250 ms (that is, for round-trip times that are larger than 500 ms). Hence, one embodiment that corresponds to this embodiment uses the following metric:

$$exp(-1.1D) \leq m_{v,D} \leq exp(-2.0D)$$

with an average of $$m_{v,D} = exp(-1.5D)$$

That is, $\alpha_v = 1.5$, $\beta_v = 23$, yielding $\delta_v = 15$. Also, using the bounds for $\alpha_v$ and $\beta_v$ obtained above, the corresponding minimum and maximum values for $\delta_v$ become: $10 \leq \delta_v \leq 23$.

Metric for Video Traffic

In this section, we describe the derivation of one embodiment of a metric for video. In this embodiment, we use a model that is very similar to that used for voice. Indeed, it is assumed in this embodiment that the degradation of a voice conversation because of excessive delay is very similar to the degradation of a video communication. In applications such as videoconferencing, the aural sense (the fact that one end is listening to the other end) is complemented by the visual sense (that is, the fact that one end also sees the other end). As a result, in some embodiments, the video metric can be considered slightly less sensitive to delay than the voice metric.

As far as loss is concerned, in some embodiments, the voice metric underestimates the effect of loss in video quality; indeed, in such embodiments, the loss of one video frame can affect a large number of frames. The actual number of frames affected depends on the encoding of the video sequence. In this embodiment, we use the concept of useful frames to derive, from the metric obtained for voice, a metric that can be applied for video. A useful frame denotes a frame that is successfully decoded at the receiver. In some embodiments, the effect of loss on the metric can be increased by taking into account the average number of frames lost by the encoder upon the loss of a frame as video traffic traverses a path (that is, in some embodiments, as video traverses the network). In such an embodiment, the ratio of frame loss (that is, those frames that the receiver is unable to decode successfully) vs. packet loss is used to obtain a scale factor that can be applied to the loss component of the voice metric function, yielding the loss component of the video metric. In this embodiment, the following methodology is used to derive this ratio. First, a model for frame loss along the path is assumed. In this embodiment, it is assumed that all frames are affected by lost independently, e.g., the loss model is Bernoulli. Those skilled in the art can follow the same methodology and derive a similar metric for video for other loss models considered. (Specifically, in some embodiments of this invention, it is useful to consider a loss model that is clustered, following a model of loss that is attributed to the Internet.) The independent model can, in some embodiments, be applied to the Internet, since every frame is typically formed by more than one packet; that is, in such an embodiment, it is assumed that a cluster of packet loss occurs in a single frame, hence this independent assumption holds in the Internet. In some embodiment, it is assumed that a Group of Pictures (GOP) contains N frames, one I frame, and N–1 P frames. If an I frame is lost, the rest of the N–1 frames of the GOP are lost; if the first P frame is lost, the rest N–2 frames of the GOP are affected, and so on. Therefore, in some embodiments, the scaling factor can be computed as:

$$SF_{video} = (1/N) \times [1 + 2 + \ldots + (N-1)] = (N-1)/2$$

Hence, in some embodiments, the video model becomes:

$$\text{metric}_{video}=exp(-D-69l)$$

That is, $\alpha_v=1.0$, $\beta_v=69$, yielding $\delta_v=69$. Note that in this embodiment, the value of $\alpha_v$ is smaller for video than for voice, to take into account the fact that video is less sensitive to delay. Also, in this embodiment, the value of $\beta_v$ is scaled by a factor $SF_{video}=3$, which corresponds to N=7. Those skilled in the art can derive metrics that use different values of $\alpha_v=1.0$, $\beta_v=69$, depending on the set of assumptions used. Also, those skilled in the art can use the methodology described above to derive various metrics, based on different parameters, depending on the assumptions.

Metric for TCP Data Traffic

In this section, we describe an embodiment of this invention that applies for generic TCP traffic. We find the appropriate values for $\alpha_d$, $\beta_d$ and hence $\delta_d$ in this context. In some embodiments of this invention, the metric is applied to short TCP connections. In other embodiments, the metric is adapted to the throughput of a typical file transfer, assumed to be 75 KBytes; in yet other embodiments, the metric is to be adapted to the throughput of an infinite file transfer. Some embodiments that cover two cases: (1) the latency of short transactions (e.g., a buy button on some web site) and (2) the throughput of files that have a "typical" size of 75 KBytes. Those skilled in the art can use a similar methodology to derive the metric for files of other sizes for other embodiments.

Optimizing $\delta_d$ to Capture the Increase in Latency for a Short Connection

In some embodiments, the performance metric used for short connections is the latency incurred from the instant the user asks for the transaction to be sent, to the time the packet containing the transaction arrives at the destination. Hence, $l_D=\text{Latency}(D_0)/\text{Latency}(D)$ and $l_l=\text{Latency}(0)/\text{Latency}(l)$ are the corresponding normalized metrics, where l represents the one-way packet loss rate on the path, D represents the one-way delay, and $D_0$ is the minimum assumed one-way delay $RTT_0/2=25$ ms. In one embodiment, we approximate the latter two measures with negative exponentials, yielding to $m_{dD}$ and $m_{dl}$, respectively, i.e., $$m_{dD}=exp(-\alpha_d D) \approx \text{Latency}(D_0)/\text{Latency}(D)$$

$$m_{dl}=exp(-\beta_d l) \approx \text{Latency}(0)/\text{Latency}(l)$$

Note that the equation for $m_{dD}$ seems to lead to the following discrepancy: $m_{dD}(D_0) \neq 1$, while $l_D(D_0)=1$. It appears that this discrepancy could have been avoided by using a normalized version of $m_{dD}$, $m_{dD}(D)=exp[-\alpha_d(D-D_0)]$ so that $m_{dD}(D_0)=1$. However, by doing so, we lose the similarity between the performance metrics for voice and data. Also, as will be seen in the following graphs, $m_{dD}=exp(-\alpha_d D)$ approximates $l_D(D_0)$ quite well. Hence, in this embodiment, there is no incentive in normalizing $m_{dD}$ in this fashion. In other embodiments, normalizing $m_{dD}$ could be warranted.

Figure 6:
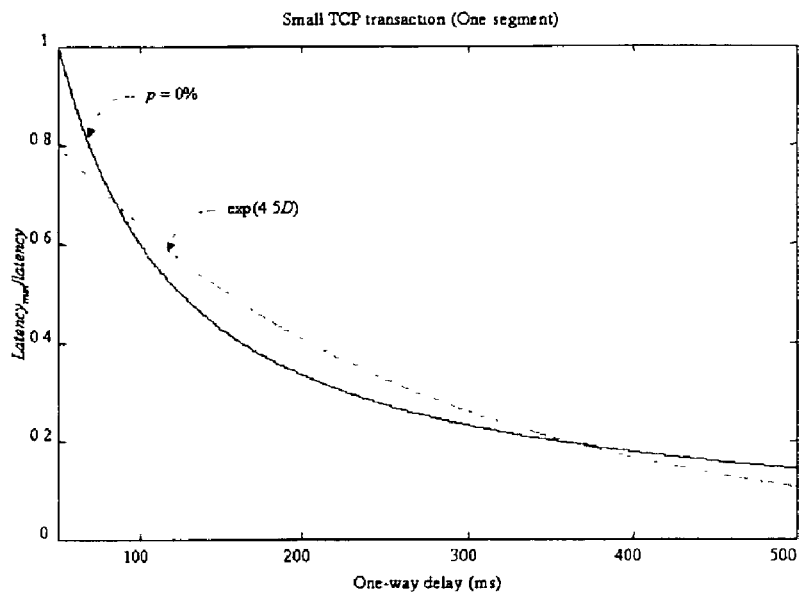
FIG. 6 shows an embodiment of approximating $Latency_{min}/Latency$ of some embodiments versus (a) one-way delay and (2) loss rate with negative exponentials.
Figure 6:
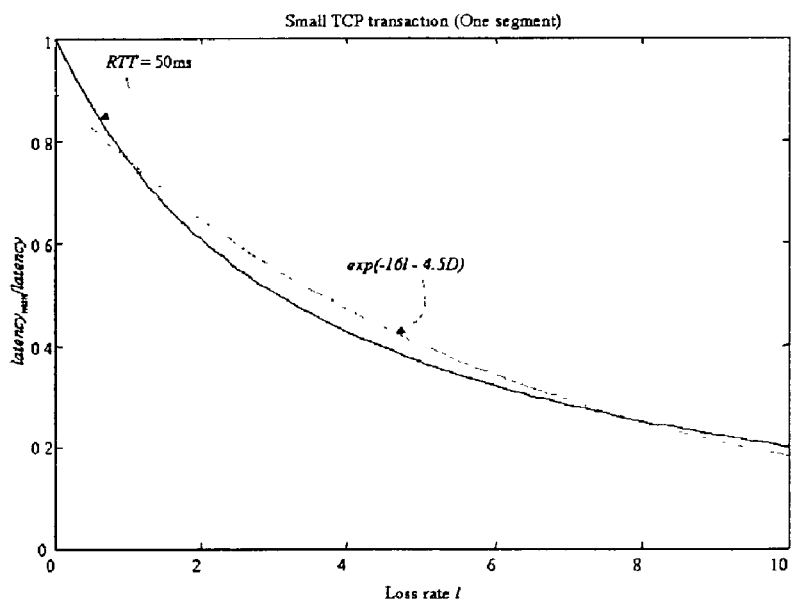

We start with an approximation of $l_D$, that involves the derivation of a single constant $\alpha_d$. This is done in FIG. 6a. As can be seen from the figure, $m_{dD}(25 \text{ ms}) \neq 1$, as expected. Approximating $l_D$ with $m_{dD}$ leads to an overestimation of the performance degradation for low one-way delays (that is, for D<100 ms) and very large delays (that is, for D>400 ms). However, the approximation is quite reasonable for D in the [0, 500 ms] range, that is, for RTTs ranging from 0 to one second. The corresponding value of $\alpha_d$ is 4.5, yielding to $m_{dD}=exp(-4.5D)$. Using the value $\alpha_d=4.5$ thus obtained, we now approximate $l_l$ using $m_{dD} \cdot m_{dl}=exp(-\alpha_d D_0 - \beta_d l)$; the result is shown in FIG. 6b. the approximation seems reasonable in this case too, leading only to a slight underestimation for very low (that is, lower than 1%) and very large (that is, larger than 8%) loss rates. The resulting value of $\beta_d$ is 16, and the corresponding $m_{dl}$ becomes $m_{dl}=exp(-16l)$.

Therefore, in some embodiments, the corresponding value of $\delta_d$ in this case is 16/4.5=3.6. That is, for such embodiments, the value of $\delta$ is much lower for data traffic than for voice traffic (in which case $\delta$ was, as shown above equal to 15). In fact, in one embodiment with TCP traffic, the relative importance of delay as compared to loss is much higher. In one embodiment with video traffic, 1% loss rate was equivalent to a 150 ms delay, whereas in one embodiment with TCP traffic, a 1% loss rate is only worth a 36 ms delay. Conversely, a 100 ms delay in one embodiment with voice traffic is equivalent to a mere 0.6% loss rate, whereas a 100 ms delay in one embodiment with TCP traffic is equivalent to a 2.78% loss rate.

Figure 7:
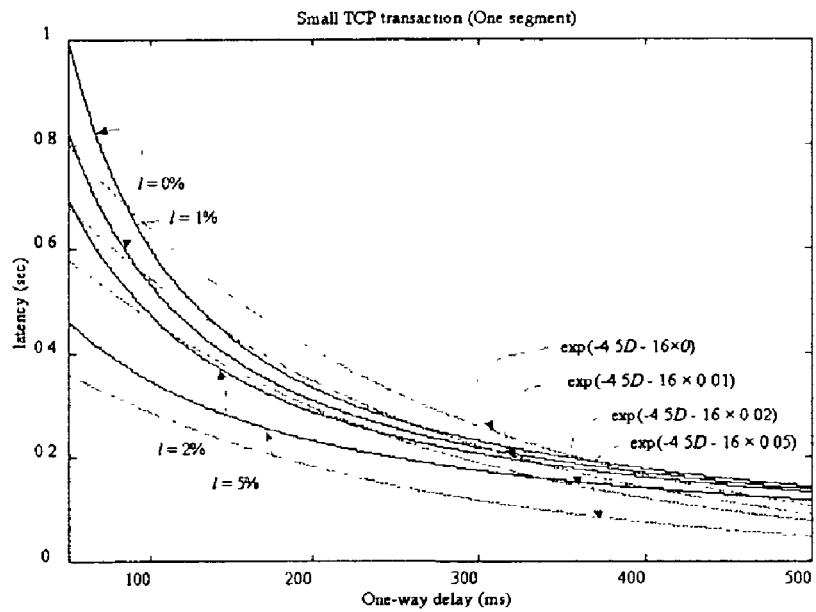
FIG. 7 shows an embodiment of approximating $Latency_{min}/Latency$ of some embodiments versus (a) one-way delay and (2) packet loss with negative exponentials.
Figure 7:
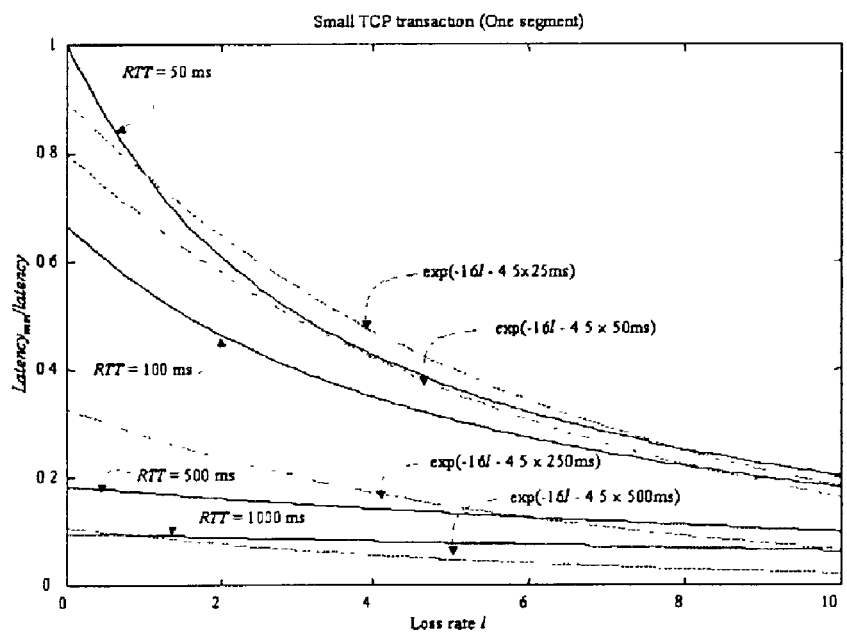

In FIG. 7, we show the approximations for a range of loss rates and one-way delays in order to understand the effectiveness of our approximations when both packet loss and delay come into play concurrently. Our approximation does surprisingly well in most of the ranges of interest for delay and loss rate, respectively.

Optimizing $\delta_d$ to Capture the Decrease in Throughput for a Connection of Typical File Size A similar procedure is used in this section to derive some embodiments, where the metric negative exponential metric captures the decrease in throughput for a connection of typical file size. In such embodiments, the performance metric of interest is the average achievable connection throughput. In such embodiments, $t_D=\text{Throughput}(D)/\text{Throughput}(D_0)$ and $t_l=\text{Throughput}(l)/\text{Throughput}(0)$ are the appropriate normalized metrics, where as described above, l represents the one-way packet loss rate on the path, D represents the one-way delay, and $D_0$ is the minimum assumed one-way delay $RTT_0/2=25$ ms. Assuming that we are able to approximate the latter two measures with negative exponentials, yielding to $m_{dD}$ and $m_{dl}$, respectively, we must hence have $$m_{dD}=exp(-\alpha_d D) \approx \text{Throughput}(D)/\text{Throughput}(D_0)$$

$$m_{dl}=exp(-\beta_d l) \approx \text{Throughput}(l)/\text{Throughput}(0)$$

Note that, as in the previous sub-section, the equation for $m_{dD}$ seems to lead to the following discrepancy: $m_{dD}(D_0) \neq 1$, while $t_D(D_0)=1$. It appears that this discrepancy could have been avoided by using a normalized version of $m_{dD}$, $m_{dD}(D)=exp[-\alpha_d(D-D_0)]$ so that $m_{dD}(D_0)=1$. However, for the same reasons described in one embodiment with short TCP connections, some embodiments (described here) find no incentive in normalizing $m_{dD}$ in this fashion. (Other embodiments could, on the other hand, find it useful to normalize $m_{dD}$ in this fashion.).

Figure 8:
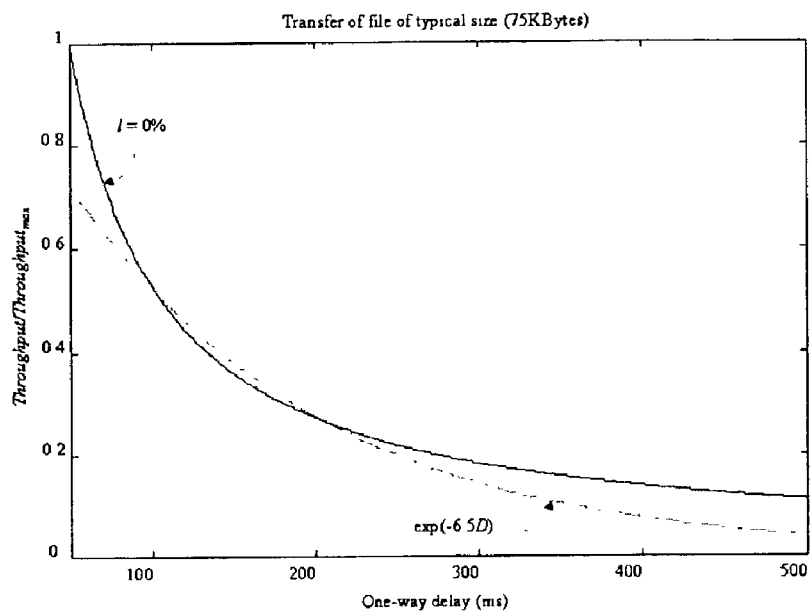
FIG. 8 approximating $Throughput/Throughput_{max}$ of some embodiments versus (a) one-way delay and (2) packet loss with negative exponentials.
Figure 8:
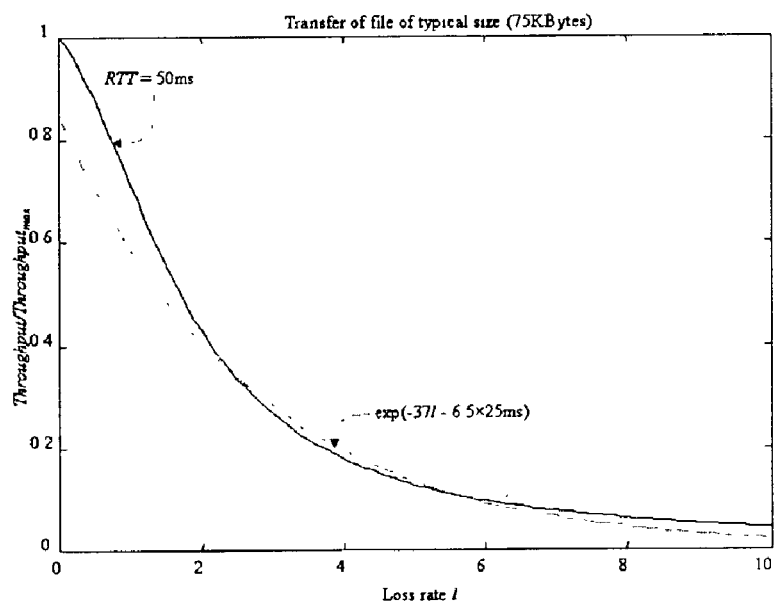

In some embodiments, an approximation of $t_D$ can be found, which involves the derivation of a single constant $\alpha_d$. (See FIG. 8a.) As for short TCP connections, $m_{dD}(25 \text{ ms}) \neq 1$, as expected. Also, the approximation is quite reasonable for D in the [0, 500 ms] range, that is, for RTTs ranging from 0 to one second. The corresponding value of $\alpha_d$ is 6.5, yielding to $m_{dD}=exp(-6.5D)$. Using the value of $\alpha_d=6.5$ thus obtained, $t_l$ can be approximated using $m_{dD} \cdot m_{dl}=exp(-\alpha_d D_0 - \beta_d l)$; the result is shown in FIG. 8b. The approximation seems reasonable in this case too. The resulting value of $\beta_d$ is 37, and the corresponding $m_{dl}$ becomes $m_{dl}=exp(-37l)$.

Figure 9:
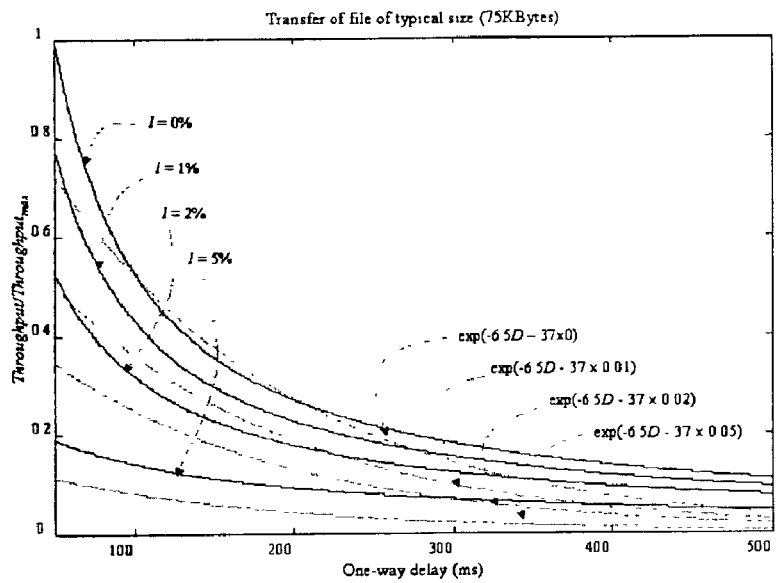
FIG. 9 approximating $Throughput/Throughput_{max}$ of some embodiments versus (a) one-way delay and (2) packet loss with negative exponentials.
Figure 9:
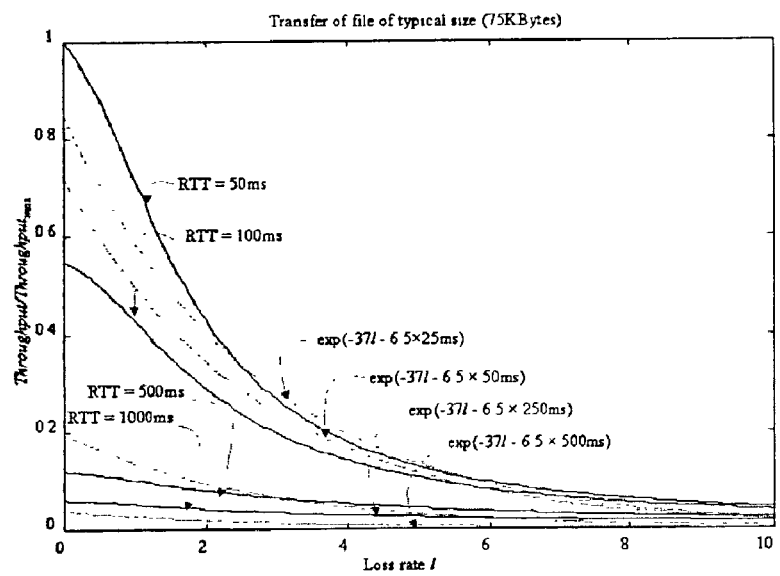

Therefore, for such embodiments, the corresponding value of $\delta_d$ is 37/6.5=5.7. That is, when these assumptions hold, the value of $\delta$ is significantly higher than for short TCP connections (3.6), but still lower than for voice traffic (10 minimum, 15 on average). In fact, in one embodiment with TCP traffic, the relative importance of delay as compared to loss decreases as the file transferred increases. In one embodiment with typical file transfers, 1% loss rate is equivalent to a 57 ms delay, which is in between the 36 ms delay obtained in one embodiment with short TCP connections and the 150 ms delay obtained in one embodiment with voice traffic. Conversely, a 100 ms delay in one embodiment with typical TCP connections represents a 1.75% loss rate, in between the low 0.6% loss rate obtained in one embodiment with voice and the large 2.78% loss rate obtained in one embodiment with short TCP connections. In order to understand the effectiveness of these approximations in such embodiments when both packet loss and delay come into play concurrently, we show in FIG. 9 the approximations for a range of loss rates and one-way delays. As for short TCP connections, our approximation does surprisingly well in most of the ranges of interest for delay and loss rate, respectively.

Unified Metric for TCP Traffic

In summary, the graphs above show that, in some embodiments, the appropriate values of $\delta_d$ for short connections and typical file transfers are 3.6 and 5.7, respectively. In some embodiments, it is desirable that one value of $\delta_d$ be applied to a number of TCP applications; in some embodiments, $\delta_d$ can be set to the average of both values, 4.6. In other embodiments, it could be desirable to use different values for each. Using a similar methodology, those skilled in the art can derive embodiments with different parameters, and different values for these parameters.

Unified Metric for Both Voice and TCP Data Traffic

Summarizing our Results

Table 1 below summarizes the results described in the previous two sections for some embodiments. Other embodiments for voice traffic can take into account the effect of clip length.

TABLE 1

Summary of values for this embodiment

| Traffic Type | α | β | δ |
|---|---|---|---|
| Voice | 1.5 | 23 | 15 |
| TCP | | | |
| Short TCP connections | 4.5 | 16 | 3.6 |
| Typical TCP transfers | 6.5 | 37 | 5.7 |

In some embodiments, it is desirable to use one metric for both voice and tcp traffic; in at least one or more of such embodiments, the metric describe above with δ=10 can be used.

Deriving User-perceived Performance Measures for Web Applications

Figure 10:
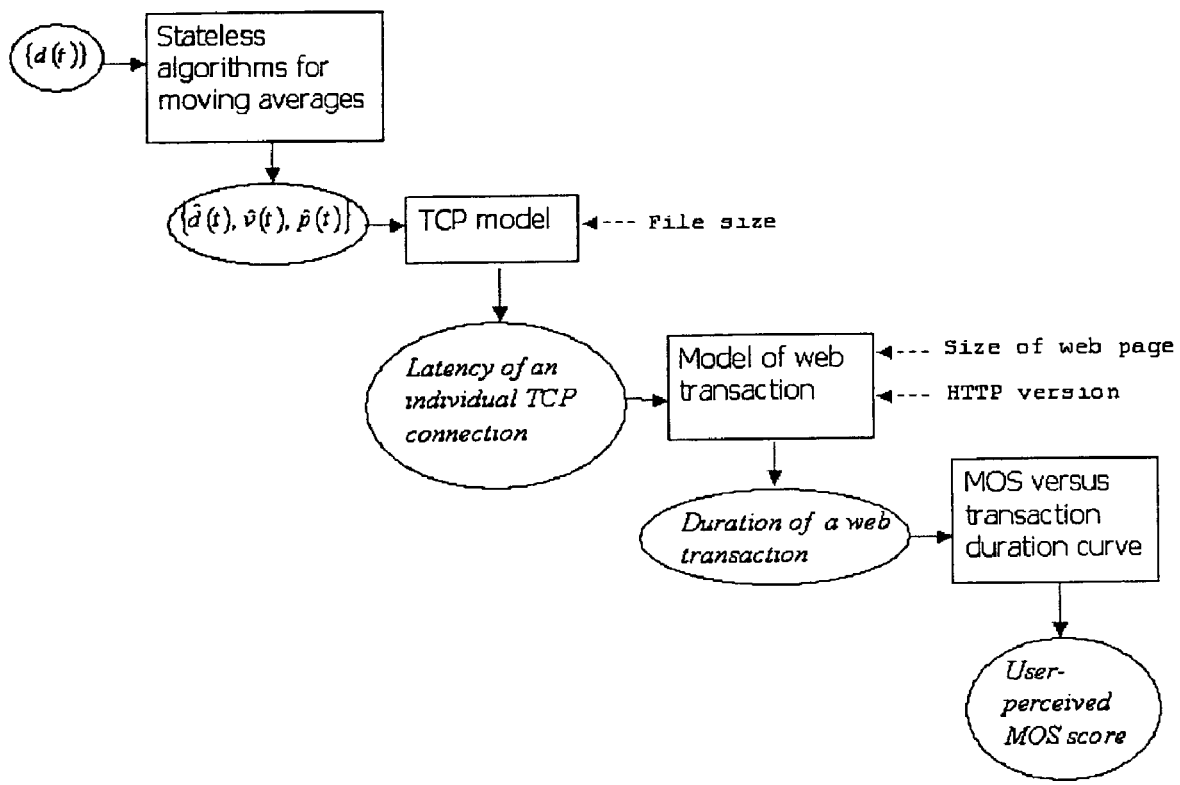
FIG. 10 series of mappings involved in the translation of raw measurement traces into a web transaction score of some embodiments.

In some embodiments, the metric measures the quality of specific applications used by humans, that use TCP for transport. For some of these embodiments, adequate performance metrics measure the model the subjective user-perceived quality of the application. Hence, in some embodiments, TCP performance can be mapped to objective application performance, which, in turn, can be mapped to user-perceived quality metrics. In some embodiments, the application of interest includes a web transaction (http). Other embodiments can focus on constructing a metric for other such applications, such as telnet, ftp, or other. In some embodiment, a mapping between the web transaction duration and the underlying latency of a TCP transaction can be derived and used. Using this model, the duration of a web transaction can be found as a function of the network performance metrics (e.g., delay, jitter, and loss). In turn, for some embodiments, the duration of a web transaction can then be mapped to an application score, which can take into account the subjective perception of the application quality by the user. The sequence of such mappings is shown in FIG. 10. In this document, we provide the insights behind some embodiments, that involves the choice of models at each of the steps shown in the procedure. We start by describing the model used for TCP transactions that corresponds to some embodiments. We then go over the specifics of the HTTP model used (yielding the duration of a web transaction) in some embodiments. Finally, we explain how, for some embodiments, the duration of a web transaction is mapped to a user-perceived metric.

TCP Models

TCP Functions and Mechanisms

Figure 11:
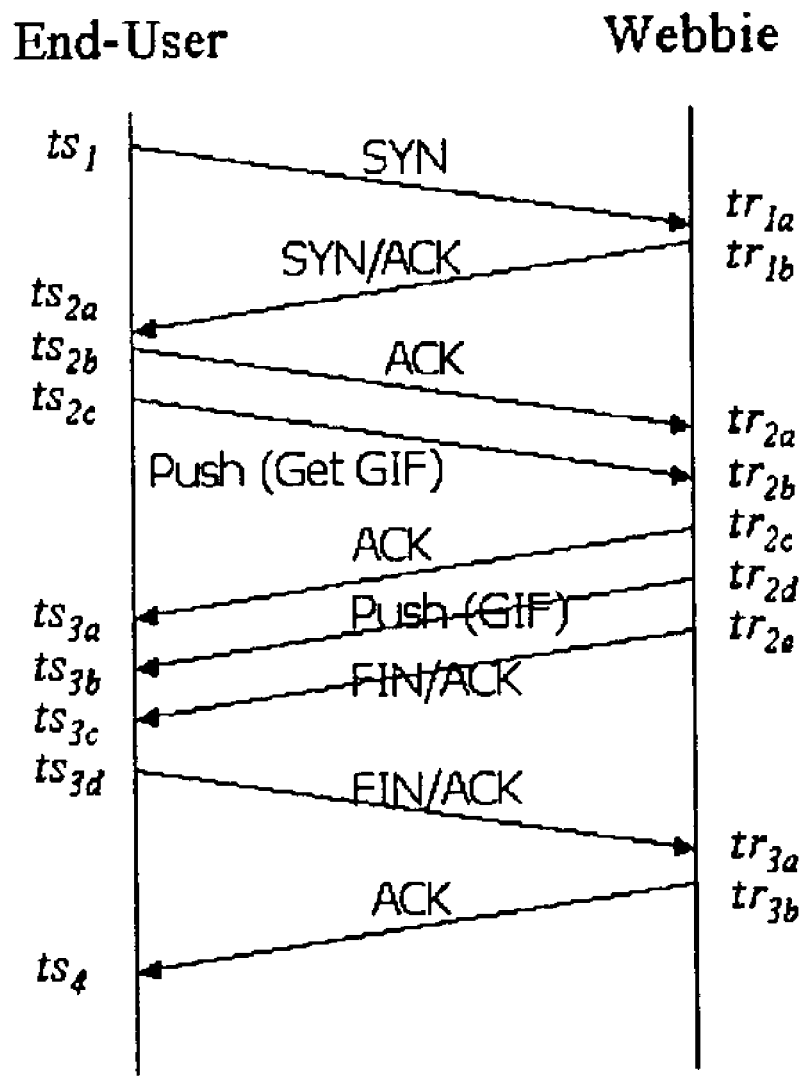
FIG. 11 dynamics of a Simple TCP connection of some embodiments.

In the following, we describe the Transport Control Protocol (TCP) modeled in some embodiments. TCP is a window-based protocol which principal function is to provide a reliable transport between two end-points. It starts with a protocol handshake, followed by the transmission of packets using a sliding-window algorithm, according to which the sending window advances as acknowledgments are received. A simple TCP transfer is shown in FIG. 11. TCP is also provided with mechanisms that render its utilization of resources (that is, bandwidth and buffer) in the network adaptive, depending on the conditions in the network (e.g., loading, congestion, etc.). These mechanisms are slow start, congestion avoidance, fast retransmit, and fast recovery. In the following, we briefly describe each of these phases. More details can be found both in the original congestion avoidance paper by Jacobson V. Jacobson, *Congestion Avoidance and Control*, SIGCOMM' 88.and in the invaluable book by Stevens W. R. Stevens, *TCP/IP Illustrated, Volume 1: The Protocols*, Addison-Wesley, 1996.

Protocol Handshake

A TCP connection is preceded by a three-way handshake: the sender first transmits a SYN, to which the receiver responds with a SYN/ACK. The sender finally replies with an ACK upon the receipt of the SYN/ACK. (See FIG. 11.)

Slow Start

It should be clear that the bandwidth used by a TCP connection increases with the window size used by the sender. Since it may not be known originally how much bandwidth is available for the transfer, a start is selecting a small window size (typically equal to one segment). After that, it increases the window size by one for each acknowledgment it receives, until one of the following events occurs:

1. Either a maximum window size is reached, which is the minimum among the default maximum window size used by TCP, typically 64 KB, and the receiver socket buffer size (which can be set by the application, and which default varies depending on the operating system).
2. Or the rate of packets sent is larger than the available bandwidth, leading to a packet loss. In this case, the window is set back to 1. A packet loss is detected using one of two ways: either the TCP retransmit timer expires, or three duplicate acknowledgments for the same sequence number of received. More details about the detection of loss can be found in the fast retransmit and fast recovery section.

In both cases, a new phase is entered, one in which a combination of slow start and congestion avoidance are performed, as described below.

Congestion Avoidance

After either the window size reaches its maximum, or the loss of a packet occurs, the TCP transfer enters the congestion avoidance phase. In this embodiment, TCP is assumed to transmit at a given window size cwnd=W (the sender window size is called the congestion window size, cwnd), and that a loss event occurs. At this point, half the value of the current window W is saved into a variable called the slow start threshold (ssthresh=W/2), and cwnd is reset to 1. Thereafter, TCP enters the slow start phase, until cwnd reaches ssthresh, at which point TCP enters the congestion avoidance phase. During this phase, and as long as no packet loss is detected, cwnd is only increased by 1/cwnd at each ACK received, leading to an approximately linear increase in the window size with time.

The rationale behind this behavior is as follows: the original window size was clearly too large, since it resulted in a packet loss. Hence, a lower window size must be used, and this window size is most probably somewhere between W/2 and W. Accordingly, slow-start allows cwnd to reach W/2 very quickly (i.e., exponentially); at this point, a bandwidth discovery process is initiated, in which TCP attempts, in a greedy manner, to obtain as much bandwidth as it can. In case a packet loss occurs again at any step of the process, cwnd is reset to 1 again, and the process is restarted again (i.e., slow start followed by congestion avoidance).

Fast Retransmit and Fast Recovery

In our discussion of congestion avoidance, we did not differentiate between types of packet loss. However, the TCP sender detects packet loss using one of two methods:

1. Timeout: Once TCP sends a packet, it starts a timer RTO. If the ACK for that packet is not received at the expiry of RTO, the packet is recorded as lost. RTO is computed in one the following ways for some embodiments:

During handshake, the time-out is initialized to a large value, for example either 3 seconds in some embodiments, 5.8 in some embodiments.

Once Round-trip time measurements are obtained, then RTO is obtained using the following formula in some embodiments:

RTO=A+4D,

Where A is a moving average of the round-trip time, while D is a moving average of the mean deviation of the round trip time, i.e. the quantity |M−A|, where M denotes the latest round-trip time measurement obtained at the sender side. More specifically, for each packet received, A and D are obtained as follows (even though A and D are typically only updated once every 500 ms).

A←(1−g)A+gM

D←D+g(|M−A|−D)

Where g is a small gain factor (which, in some embodiments is set to a negative power of two).

2. Triple duplicate ACKs: in case a packet is lost, the receiver will generate for each following segment received an ACK for the same sequence number, which corresponds to that of the lost packet. Hence, in case the sender receivers a multitude of ACKs for the same sequence number, it can assume that the corresponding packet was lost. In TCP, three duplicate ACKs (that is, four ACKs for the same sequence number) signal a packet loss. Only in this case do the Fast Retransmit and Fast Recovery algorithms kick in for some embodiments.

Hence, once a triple duplicate ACK is detected, the sender enters two processes: it first retransmits the segment it believes is lost. This is called a Fast Retransmit (since TCP doesn't wait for a time-out to occur before retransmitting). Then, as in congestion avoidance, ssthresh is set to half the current window. However, TCP sets cwnd to ssthresh in this case, hence avoiding the slow-start phase.

Figure 12:
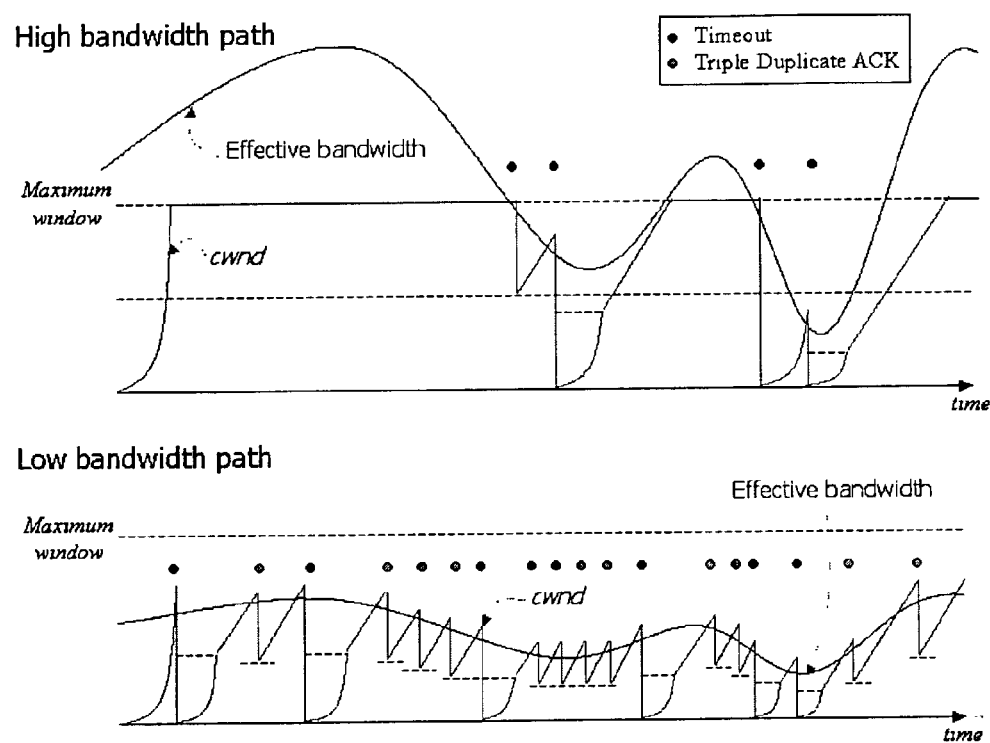
FIG. 12 cwnd versus time for a TCP connection over of some embodiments (a) a high bandwidth path and (a) a low bandwidth path.

Typical (and simplified) traces of the TCP window size in time are shown in FIG. 12 for two cases: in one case, transmitting at the maximum window seldom saturates the link. This can be the high bandwidth case; effective bandwidth can be translated to a scale that is consistent to that of window. That is, we can actually be showing the product of effective bandwidth and round-trip time. Round-trip time can assumed to be constant in the figure (if not, then the window size increase may not have been linear with time during the congestion avoidance period)). In the other case, the appropriate ideal window to be used is significantly lower than the maximum window size chosen by the source. Clearly, the difference in TCP behavior between the two cases is very significant. In particular, the only way the window size is limited in one embodiment with the low bandwidth path is through packet loss. Combined with TCP's greediness in its attempt to capture more bandwidth from the link, this fact leads to a systematic pattern of packet loss.

TCP Performance

The description of TCP's mechanisms above is helpful in understanding how a performance model for TCP is derived. Here, the model for TCP latency derived in N. Cardwell, S. Savage, and T. Anderson, *Modeling TCP Latency*, IEEE INFOCOM 2000, April 2000, is reviewed, as we believe it to be the appropriate in capturing some embodiments owing to its accurate modeling of the protocol handshake and slow-start. The equation below summarizes the findings of N. Cardwell, S. Savage, and T. Anderson, *Modeling TCP Latency*, IEEE INFOCOM 2000, April 2000.

$$\text{Latency of a } TCP \text{ Transaction} = RTT + 2T_s\left(\frac{1-p}{1-2p} - 1\right) \text{(Handshake)} +$$

$$RTT \begin{cases} \log\left(\frac{W_{max}}{w_1}\right) + 1 + \frac{1}{W_{max}}\left(E[d_{ss}] - \frac{w_{max} - w_1}{-1}\right), E[W_{ss}] > W_{max} \\ \log\left(\frac{E[d_{ss}](-1)}{w_1} + 1\right), E[W_{ss}] \leq W_{max} \end{cases}$$

$$\text{(Slow-start)} +$$

$$(1 - (1-p)^d)\left(Q(p, E[W_{ss}])\frac{G(p)T_0}{1-p} + (1 - Q(p, E[W_{ss}]))RTT\right)$$

$$\text{(First loss)} + (d - E[d_{ss}])$$

$$\begin{cases} \dfrac{RTT\left(\frac{b}{2}W(p) + 1\right) + Q(p, W(p))\frac{G(p)RTO}{1-p}}{\frac{1-p}{p} + \frac{W(p)}{2} + Q(p, W(p))}, W(p) < W_{max} \\ \dfrac{RTT\left(\frac{b}{8}W_{max} + \frac{1-p}{pW_{max}} + 2\right) + Q(p, W_{max})\frac{G(p)RTO}{1-p}}{\frac{1-p}{p} + \frac{W_{max}}{2} + Q(p, W_{max})}, W(p) \geq W_{max} \end{cases}$$

$$\text{(Transfer of remaining bits)} + D_{ack} \text{ (Delayed Acks)}$$

where
$T_0 = T_s = 3$ seconds
$RTO = RTT + 4 \times mdev(RTT)$
$\gamma = 1 + (1/b)$
$E[d_{ss}] = ((1-(1-p)^d)(1-p))/p$
$E[w_{ss}] = (E[d_{ss}](\gamma-1)/\gamma) + (w_1/\gamma)$
$Q(p,w) = \min(1, (1+(1-p)^3(1-(1-p)^{w-3}))/((1-(1-p)^w)/(1-p)^3)))$
$G(p) = 1 + p + 2p^2 + 4p^3 + 8p^4 + 16p^5 + 32p^6$
$W(p) = ((2+b)/(3b)) + Sqrt(((8(1-p))/(3\ b\ p)) + ((2+b)/(3b))^2)$
$D_{axk} = 100$ ms As shown in the equation above, the latency of a TCP connection L depends on the file size to be transferred d (in number of segments), the packet round-trip time RTT, the packet RTT jitter mdev(RTT), and the packet loss rate p. L is constituted of various components, which are, in order, the latency associated with the handshake, the slow-start, the first loss, and the transfer of the remaining bits. We describe the specifics of each and then include comments pertaining to the overall equation.

Protocol Handshake

This equation states that the average time needed to complete the protocol handshake is one round trip time, to which a timeout is added to each lost packet in the transaction. Note that at this stage, the timeout is typically as large as 3 seconds for some embodiments, so even a small loss probability can be significant.

Slow Start

As described above, slow start lasts from the end of the handshake up to the time the window size ceases to increase (whether because a packet was lost, or because the window has reached its maximum value). In the context of N. Cardwell, S. Savage, and T. Anderson, *Modeling TCP Latency*, IEEE INFOCOM 2000, April 2000, in an attempt to make the math simpler, slow start is given a slightly different meaning. In fact, slow start is defined as the time period separating the end of the handshake up to the first loss, independently of whether the maximum window size $W_{max}$ is reached. Given the packet loss p and the dynamics of the window size increase during slow start, both the expected number of segments sent during slow start $E[d_{ss}]$ and the window size reached at the end of the slow start process $E[W_{ss}]$ are computed. Clearly, as shown in the equation, in case $E[W_{ss}] > W_{max}$, then the latency calculation is divided into two periods, the first capturing the exponential window growth, and the second capturing the period in which the window is constant, equal to $W_{max}$. It is interesting to note that in case packet loss is null, then slow start according to this definition lasts for the entire length of the connection. Conversely, in case $E[W_{ss}] \leq W_{max}$, then the latency associated with slow start only includes a single component that corresponds to the exponential increase in window size.

First Loss

As described above, a packet loss is detected within some time period that translates directly into additional delay incurred by the user. This delay depends on whether the packet was detected through a time-out or a triple duplicate. In case of a time-out, then the delay is equal to RTO, which in this case is set to the initial 3 seconds in some embodiments. In case of a triple duplicate ACK, the extra delay is as low as one round-trip time. In the equation above, the probability that packet loss occurs because of a timeout Q(p, w) is computed, given the loss rate p and the instantaneous window size w. The latency associated with the first loss can hence simply be computed as a weighted sum of $RTO = T_0$ and RTT. Since a loss event can result in more than one packet loss, successive time-outs can potentially occur; the factor $G(p)/(1-p)$ takes into account this fact by appropriately scaling the first time-out value $T_0$.

Transfer of Remaining Bits

The following component of the TCP latency equation corresponds to the latency incurred by the transfer of the bits that remain after this first loss. Although complex, we can see that the formula basically models the effect of loss (whether detected through timeout or the receipt of triple duplicate ACKs), and that of congestion avoidance (as witnessed by the computation of W(p), which represents the average window size given the loss rate and the dynamics of congestion avoidance). Hence, this component of the equation is basically the ratio of the remaining bits to be transferred ($d - E[d_{ss}]$) to the average rate of transfer, in turn equal to one window per time period set to the sum of RTT and whatever additional delay is caused by congestion avoidance. What this component does NOT model, however, is slow start after retransmission of timeouts. This means that the equation above assumes that TCP is more aggressive than it actually is, which results to an under-estimation of the actual latency involved in the transaction. However, N. Cardwell, S. Savage, and T. Anderson, *Modeling TCP Latency*, IEEE INFOCOM 2000, April 2000, explains that the effect of this negligence should be small.

Delayed ACKs

The final component in the equation above models (in a trivial way) the extra delay caused by delayed ACKs for some embodiments. In fact, 100 ms was measured as a good average delay increase caused by delayed ACKs in some embodiments. ACKs are not always sent back to the sender immediately after a segment is received at the destination. In fact, the functionality of TCP is as follows for some embodiments V. Paxson, *Automated Packet Trace Analysis of TCP implementations*, SIGCOMM' 97: two packets have to be replied to immediately. However, the receipt of an individual packet is only replied to at the end of a clocking timer, typically set to 200 ms in some embodiments. Hence, 100 ms seems like a good average value to be added to take into account the effect of duplicate ACKs for some embodiments. (e.g., see M. Allman, *A Web Server's View of the Transport Layer*, ACM Computer Communication Review, Vol. 30, No. 5, October 2000.

Comments about the Model

The model in M. Mathis, J. Semke, and J. Mahdavi, *The Macroscopic Behavior of the TCP Congestion Avoidance Algorithm*, ACM Computer Communication Review, July 1997, is indeed simpler, but also captures much less of the richness inherent to the behavior of TCP. As shown above, the model captures, in an intuitive way, a lot about TCP's behavior. In this section, we go over straightforward and useful comments on the model.

1. Latency does not depend on the link bandwidth. In fact, this model does not directly model the link bandwidth, but considers it through its effect on delay, jitter and loss. For example, if bandwidth is too low, then the loss rate increases (as is clear from FIG. 1). At the same time, round-trip time increases through increased queue sizes at the bottleneck link TCP time-outs. Note that for transactions that involve small file sizes, the latency is mostly affected by the first two components, i.e. the protocol handshake and slow start. Hence, the throughput of the transaction is probably unaffected by the bandwidth of the bottleneck link (that is, other than the effect of the later on loss rate or RTT).

2. Latency is in all cases a linear function of the round-trip time. It is true that this is an artifact of the above assumption (since the only non-linearity would have come from the effect of bandwidth on the latency of the TCP connection). However, since the effect of bandwidth alone is very small, the linearity of the TCP latency with the round-trip time holds in most cases in real systems.
3. Contrary to round-trip time, latency is a non-linear function of loss probability. In fact, for loss rates above 5%, the increase in latency with the loss rate accelerates significantly.

In some embodiments, the model described above can be used to model TCP behavior in one or more of the steps.

HTTP

In some embodiments, the metric measures web transactions. In this section, we describe http mechanisms used in some embodiments. In some embodiments, such transactions use the hypertext transfer protocol (HTTP), which, in some embodiments defines how TCP is used for the transfer of the different components of a web page (that is, for example, the html page, the different images, etc). In some embodiments, the first version of HTTP, HTTP/1.0, described in RFC 1945 T. Berners-Lee, R. Fielding, and H. Frystyk, *Hypertext Transfer Protocol—HTTP/1.0*, IETF Request for Comment RFC 1945, May 1996, encourages the following practices:

1. Different components of a given web page (e.g., the html text, and each of the different objects) are transferred using distinct TCP connections.
2. In order to increase the speed of the transaction, web browsers are allowed to open more than one TCP connection at a time. (The typical number of parallel concurrent TCP connections is 4 in some embodiments.)

In some embodiments, this approach is adequate for relatively smaller web pages, which include a few objects, when traffic on paths on the Internet is relatively limited. But as the Internet has become more and more ubiquitous, the disadvantages of this approach can become, in some embodiments more and more apparent:

1. On one hand, in some embodiments, an independent TCP connection goes through both the handshake and slow-start mechanisms. Since, in some embodiments, individual objects are relatively small, so TCP connections spend most of their time in these stages, rather than in the congestion avoidance stage. In some embodiments, this can be inefficient.
2. On the other hand, it has been shown that in some embodiments, opening a multitude of TCP connections simultaneously increases the greediness and aggressiveness of the web browser's behavior, H. F. Nielsen, J. Gettys, A. Baird-Smith, E. Prud'ommeaux, H. W. Lie, and C. Lilley, *Network Performance Effects of HTTP/1.1, CSS1, and PNG*, SIGCOMM' 97, H. Balakrishnan, V. Padmanabhan, S. Seshan, M. Steem, and R. Katz, *TCP Behavior of a Busy Internet Server: Analysis and Improvments*, IEEE Infocom 1998, S. Floyd and K. Fall, *Promoting the Use of End-to-End Congestion Control in the Internet*, IEEE/ACM Transactions on Networking, 7(6), August 1999. To understand this, we provide the following simple example (from S. Floyd and K. Fall, *Promoting the Use of End-to-End Congestion Control in the Internet*, IEEE/ACM Transactions on Networking, 7(6), August 1999). Say a data transfer is divided among N parallel, concurrent TCP transactions. Assume a packet is lost in one of the connections. If all the data were to be transferred using one single TCP connection, the lost packet would lead to the halving of the window size, i.e. to the halving of the connection throughput. Instead, when N concurrent TCP connections are used, the lost packet will only halve the window size of one of the N connections, leading to a reduction of the aggregate throughput by a mere ½N! That is, the congestion algorithm that TCP is intended to perform is skewed towards a much larger greediness and aggressiveness, leading to an increase in congestion that can in turn bear a significant degradation in the performance of all streams involved.

In some embodiments, the first problem can be solved through the setting of the Keep-Alive option T. Berners-Lee, R. Fielding, and H. Frystyk, *Hypertext Transfer Protocol—HTTP/1.0*, IETF Request for Comment RFC 1945, May 1996. In some embodiments, an open TCP connection is not closed after the object transfer is completed, but rather used for the transfer of the next object. This way, in some embodiments, the number of concurrent TCP connections remains equal to four. In some embodiments, the latency of the total web transfer can be improved by reducing the number of mandatory protocol handshakes and slow-starts. However, in some embodiments, the Keep-Alive option does not solve the second problem. In fact, in such embodiments, setting the Keep-Alive option only exacerbates the second problem, and renders the behavior of the web browser even more aggressive.

In light of such findings, a revision of HTTP (HTTP/1.1, R. Fielding, J. Gettys, J. Mogul, H. Frystyk, and T. Berners-Lee, *Hypertext Transfer Protocol—HTTP/1.1*, IETF Request for Comment RFC 2068, January 1997) included new ways to be used by the web-browser for the transfer of a web page using TCP. HTTP/1.1 advocates the use of a single TCP connection for the transfer of the entire web page. Such a connection is called persistent. This way, the second problem described above is solved and TCP recovers its original aggressiveness. In addition, the client can pipeline requests for different objects belonging to the same web page on the same TCP connection. This way, the transfer of the corresponding objects is pipelined, which has the desirable effect of reducing the variability between the delays associated to the download of each of the different objects.

Figure 13:
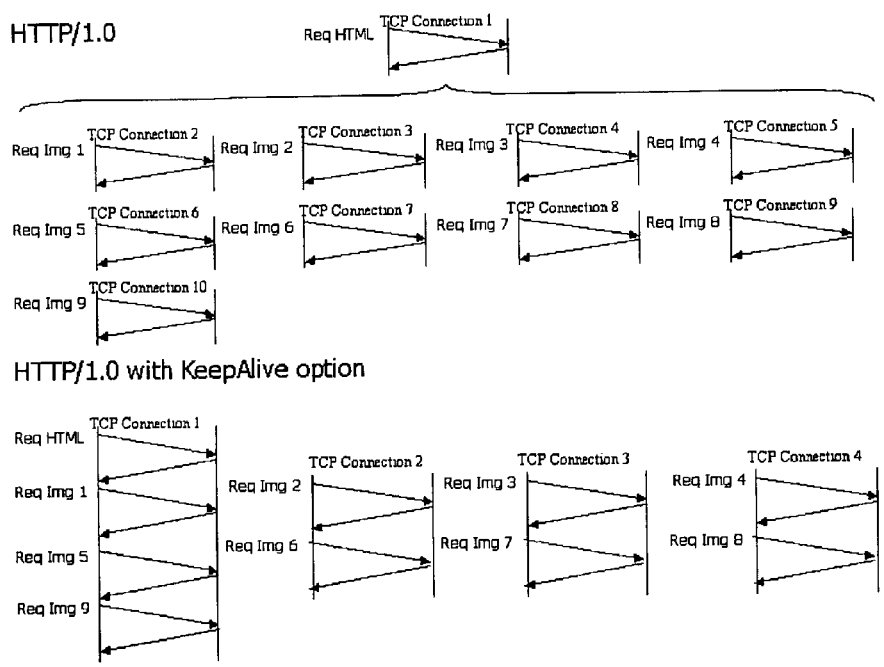
FIG. 13 download of a web page which consists of one html file and nine images using HTTP/1.0, with the Keep-Alive option either set or not of some embodiments.
Figure 14:
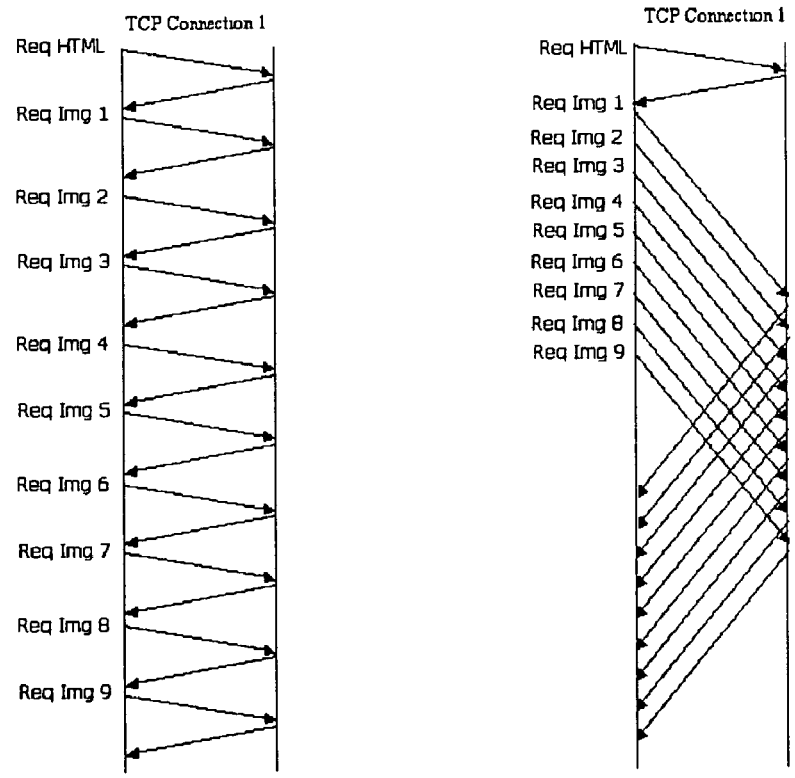
FIG. 14 download of a web page, which consists of one html file and nine images using HTTP/1.1, using either persistent connections, or persistent and pipelined connections of some embodiments.

Assume a web page includes the combination of text and 9 images. In FIGS. 13-14, the different ways to transfer a web page in some embodiments are illustrated, using some of the various HTTP/1.0 and HTTP/1.1 methods described above.

In some embodiments, assuming infinite bandwidth and zero loss probability, HTTP/1.0, with the Keep-Alive option set basically divides the time it takes to download the images by a factor of 4. However, in some embodiments, assuming the realistic case where loss rate is positive, the actual duration of the web transaction can be assumed to be the maximum among the latency of the individual TCP connections; that is, in some embodiments, the duration of the web transaction $D_w$ can be estimated as the sum of the TCP transfer of the html file, $L_{html}$, followed by the maximum among the 4 TCP connections, $L_{max}=\max(L_1, L_2, L_3, L_4)$. In some embodiments, finding the exact maximum among various TCP connections is a complex process, as it implies knowledge of the latency distribution, whereas the equation described above only derives the average latency. In some embodiments, $L_{max}$ can be approximated, based on the following assumption: assuming that only one connection among the four connections incurs a packet loss, then $L_{max}$ may simply approximated to be the duration of that particular transaction. Assuming that the loss probability on the link is equal top, each connection then may be assumed to incur a loss rate p, so that the probability of no loss by either connection can be approximated to $P_{nl}=1-P=(1-p)^4$. That is, in some embodiments, the probability that either connection experiences a loss becomes equal to $P=1-(1-p)^4$ which, in some embodiments, can be approximated to 4p for small p. That is, in some embodiments, an approximate value of $L_{max}$ can be obtained using the equation for average latency, and in some embodiments, the loss rate can be set to 4p. Other embodiments may use different approaches to yield various models.

Description of Models Used

In the following, we describe different embodiments of models that can be derived for both HTTP/1.0 and HTTP/1 0.1 downloads. In some embodiments, it can be assumed that what is downloaded is one or more plurality of objects from what is assumed to be a "typical" web site. Other embodiments of this invention can derive these results for other HTTP embodiments, and other web sites.

In some embodiments, a typical web transaction can be modeled using the following:
1. A one-segment request for the web page to be transfer.
2. . . . followed by a transfer of a file of size f. In some embodiments, the actual latency formula representing the transfer depends on whether HTTP/1.0 or HTTP/1.1 are used.

In some embodiments, we can assume that the path is characterized by a loss rate p, a round-trip time RTT, and a round-trip time jitter J.

In the case of HTTP/1.0, some embodiments assume that the Keep-Alive option is set. Also, some embodiments assume that half the file constitutes the actual html ASCII text, whereas the other half includes the different images in the file. While, in some embodiments, the ASCII is downloaded using a single TCP connection, the information pertaining to the images is downloaded, in parallel over 4 independent TCP connections. Denoting the latency of a TCP transfer of a file of size f, over a path characterized by a loss rate p, a round-trip time RTT and a round-trip time jitter J by $L(f_s, p, RTT, J)$, then the total duration of the web transaction can, in some embodiments, be approximated to $$D_{HTTP/1.0}=L(1500\ Bytes, p, RTT, J)+L(f_s/2, p, RTT, J)+L(f_s/8, 4p, RTT, J)$$

Those skilled in the art can start with a different set of assumptions, follow a similar methodology, and derive various other models that derive the total duration of an HTTP/1.0 web transaction in function of the various dynamic parameters of the path. In the case of HTTP/1.1, some embodiments assume the use of persistent, pipelined transactions. Since, in some embodiments, a single TCP transaction is used for the download of the entire file, the total duration of the web transaction can, in some embodiments, be approximated to $$D_{HTTP/1.0}=L(1500\ Bytes, p, RTT, J)+L(f_s/2, p, RTT, J)$$

Those skilled in the art can start with a different set of assumptions, follow a similar methodology, and derive various other models that derive the total duration of an HTTP/1.1 web transaction in function of the various dynamic parameters of the path.

Some Web Transaction Duration Results

Figure 15:
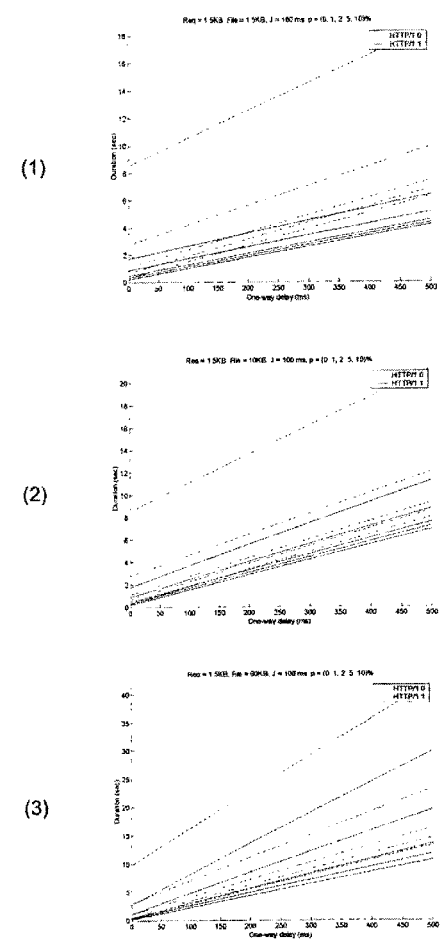
FIG. 15 latency of a typical web transaction for different file sizes, given various loss rates versus one-way delay, using either HTTP/1.0 or HTTP/1.1 of some embodiments.
Figure 16:
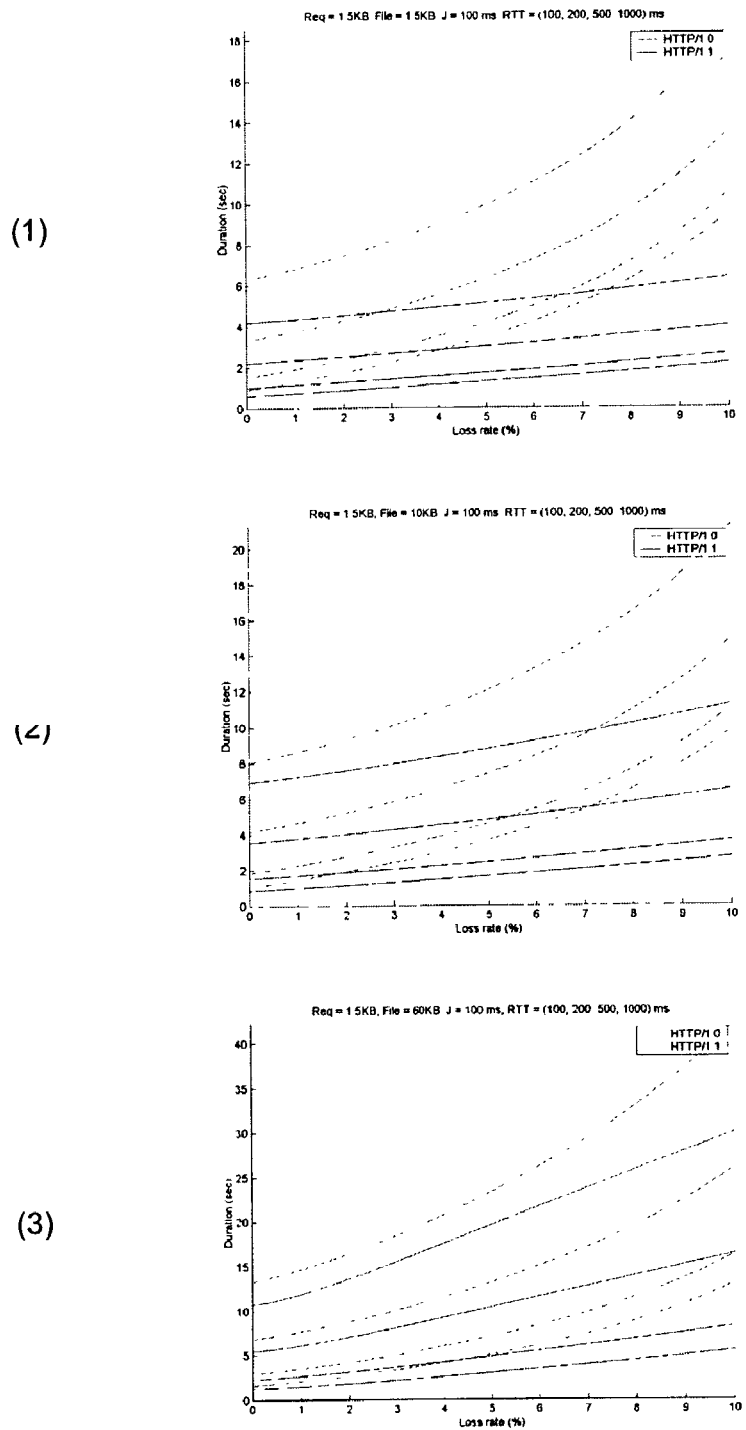
FIG. 16 typical web transaction for different file sizes, given various round-trip times versus the loss rate, using either HTTP/11.0 or HTTP/1.1 of some embodiments.
Figure 17:
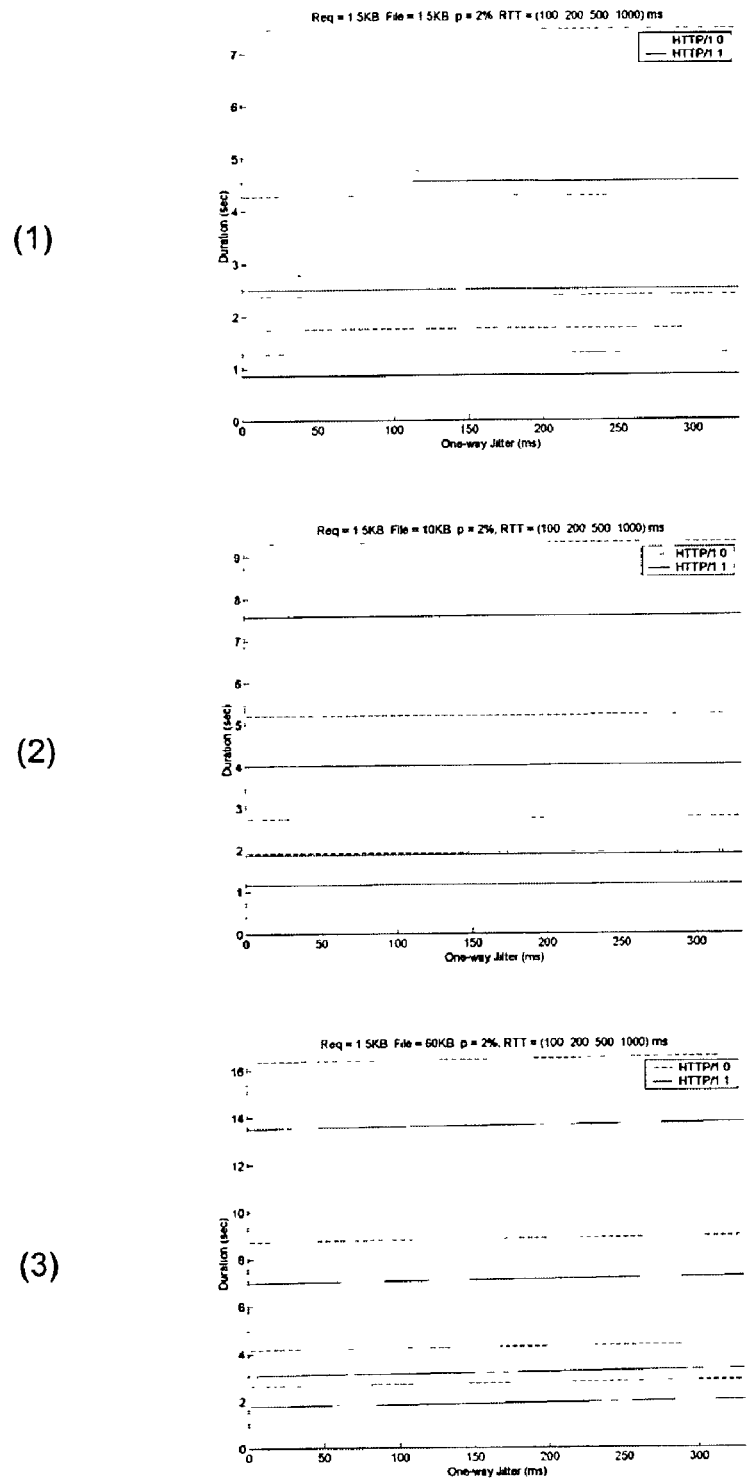
FIG. 17 latency of a typical web transaction for different file sizes, given various round-trip times versus one-way jitter, using either HTTP/1.0 or HTTP/1.1 of some embodiments.

In this section, we show a set of web transaction duration (denoted $D_w$) results for some embodiments of this invention, as a function of both round-trip time, loss rate and jitter. (See FIGS. 15-17.) In the context of these examples, the graphs are shown as a function of one-way delay and jitter, simply obtained by halving the round-trip time and round-trip time jitter, respectively. Those skilled in the art can derive examples, where the parameters in the graphs constitute round-trip parameters. Since, in some embodiments, TCP latency as shown in the previous section may be linear with round-trip time, the linearity of web transaction duration with one-way delay is expected as a result. (See FIG. 15.) Also, it can be seen from FIG. 16 that for some embodiments, the curve showing the dependence of $D_w$ on p may be convex, that is, its slope increases with increasing values of p. Since, in some embodiments, HTTP/1.0 depends on 4p, the increase of $D_w$ with p may become increasingly significant as p exceeds 5%. Conversely, in some embodiments, loss rate does not seem to affect much the duration of an HTTP/1.1 web transaction. Finally, FIG. 17 reveals that in some embodiments, the dependence of $D_w$ on jitter is very small for both HTTP/1.0 and HTTP/1.1, irrespectively of the file size; therefore, in some embodiments, the jitter parameter may be ignored.

Metric Versus Web Transaction Duration

In this section, some embodiments of the remaining task of mapping transaction duration to a measure of quality that captures the user's perception are described. The embodiments described rely in part on relevant papers on the subject, A. Bouch, N. Bhatti, and A. J. Kuchinsky, *Quality is in the eye of the beholder: Meeting users' requirements for Internet Quality of service*. To be presented at CHI'2000. The Hague, The Netherlands, Apr. 1-6, 2000, pp. 297-304.and A. Bouch, N. Bhatti, and A. J. Kuchinsky, Integrating User-Perceived Quality into Web Server Design, HP Labs Technical Report HPL-2000-3 20000121, which present experiments designed to estimate users' perception of quality in the context of web transactions. (The paper stresses, in particular on e-commerce.) In the papers, the authors have created a web site with latency programmability. (That is, they control the latency of the transfer of individual pages.) Users are asked to go through the different pages of this site, and rate the latency obtained as low, average of high. The final result is the graph shown in FIG. 18, that shows the percentage of users responding "low", "average" and "high" versus the actual duration of the web transaction.

Figure 18:
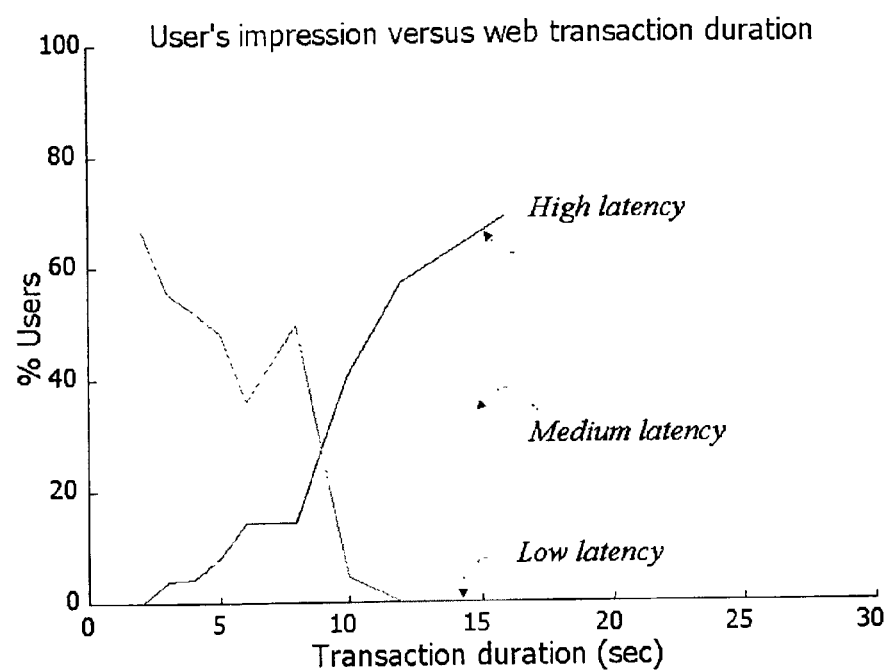
FIG. 18 user's impression versus web transaction duration A. Bouch, N. Bhatti, and A. J. Kuchinsky, *Quality is in the eye of the beholder: Meeting users' requirements for Internet Quality of Service*. To be presented at CHI'2000. The Hague, The Netherlands, Apr. 1-6, 2000, pp. 297-304.and A. Bouch, N. Bhatti, and A. J. Kuchinsky, Integrating User-Perceived Quality into Web Server Design, HP Labs Technical Report HPL-2000-3 20000121 of some embodiments.
Figure 19:
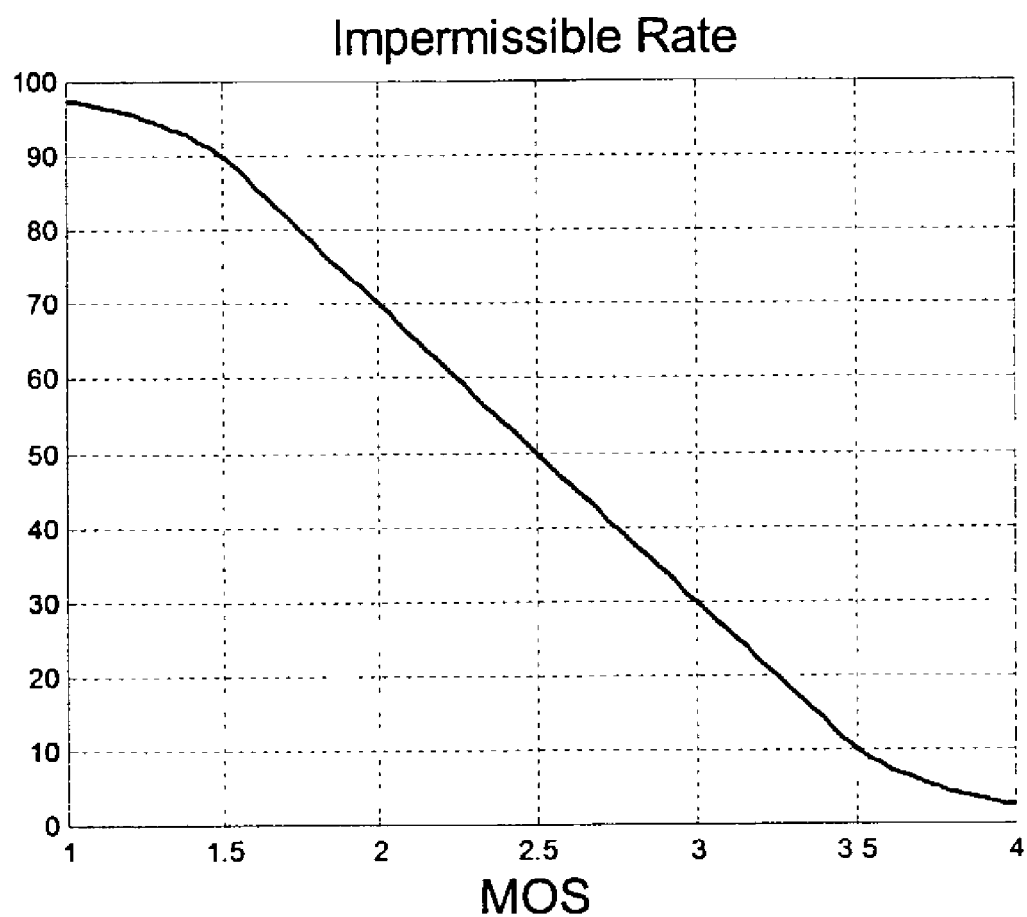
FIG. 19 impermissible rate (%) versus MOS, N. Kitawaki and K. Itoh, *Pure Delay Effects on Speech Quality in Telecommunications*, IEEE Journal of Selected Areas in Communications, Vol. 9, No. 4, May 1991 of some embodiments.

The results shown in FIG. 18 can be translated to some subjective measure of user-perceived quality, which we denote by "synthetic Mean Opinion Score" (MOS), from which the metric will be derived. In this respect, in some embodiments, a graph presented in N. Kitawaki and K. Itoh, *Pure Delay Effects on Speech Quality in Telecommunications*, IEEE Journal of Selected Areas in Communications, Vol. 9, No.4, May 1991, can be used, that maps MOS values to an "impermissible rate", that is, to the percentage of users that think the quality is unacceptable. This graph is shown in FIG. 19. For some embodiments, A MOS versus web transaction duration function can be obtained by assuming that the "high latency" rate in FIG. 18 can be interpreted as an "impermissible rate". In some embodiments, this assumption is reasonable, since, as far as the content provider is concerned, high latency is unacceptable and should never be experienced by the user. This may be thought to be true, especially for high value transactions, such as trading, or even shopping. Those skilled in the art can follow the methodology described in this document to use other studies of user-perceived quality and derive corresponding metrics.

The resulting MOS versus latency curve can be obtained for some embodiments. Interestingly, the curve shows that for these embodiments, the MOS does not degrade smoothly as transaction duration increases. In fact, in these embodiments a sharp decrease from a MOS of 5 to a MOS of 4 occurs when the transaction duration exceeds the two seconds mark. In one embodiment, the MOS ratings from 1 to 5 bear the following interpretations: 5 for Excellent, 4 for Good, 3 for Fair, 2 for Poor and 1 for Bad. Other embodiments use different values. Similarly, in some embodiments, a similar behavior occurs around the 8 seconds mark.

Applying the MOS Versus Latency Curve to the Latency Results: Some MOS Results.

Figure 20:
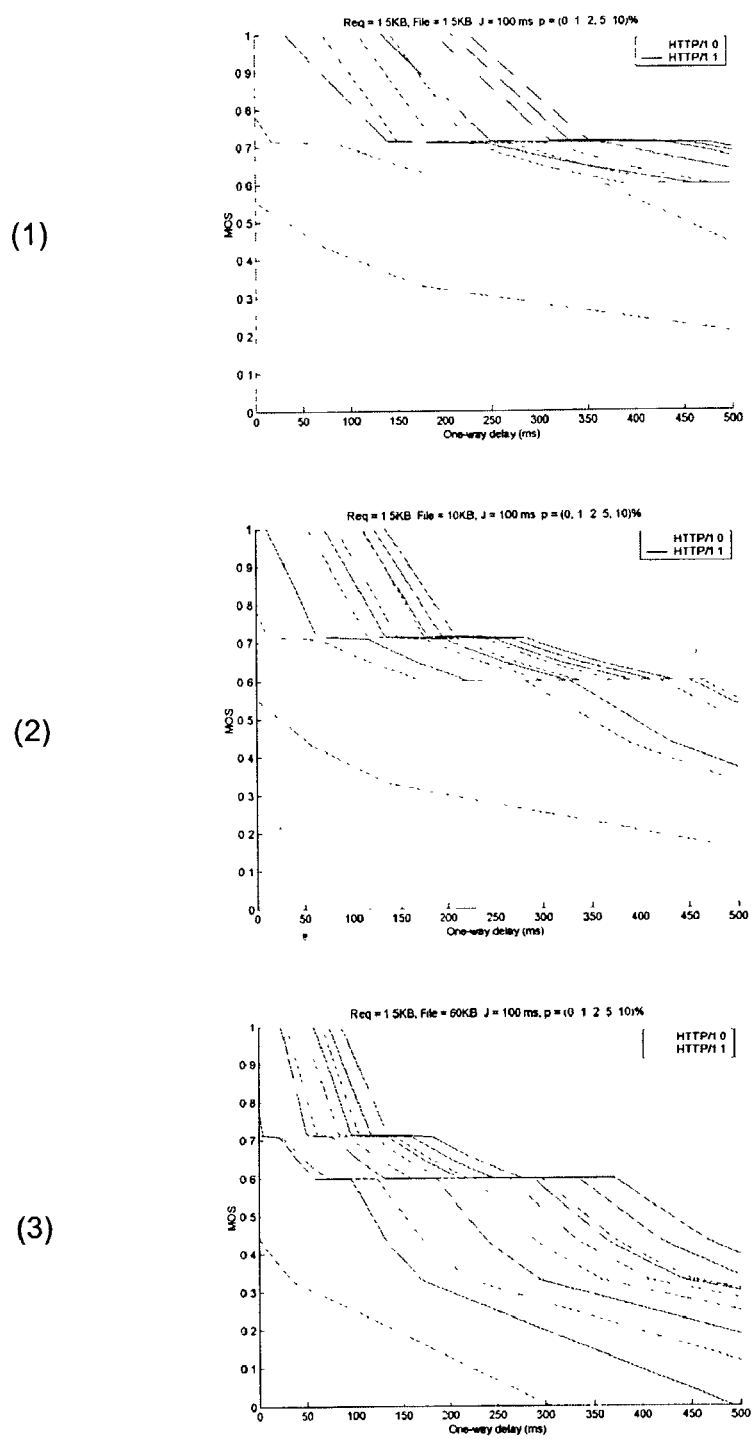
FIG. 20 metric of a typical web transaction for different file sizes, given various loss rates versus one-way delay, using either HTTP/1.0 or HTTP/1.1 of some embodiments.
Figure 21:
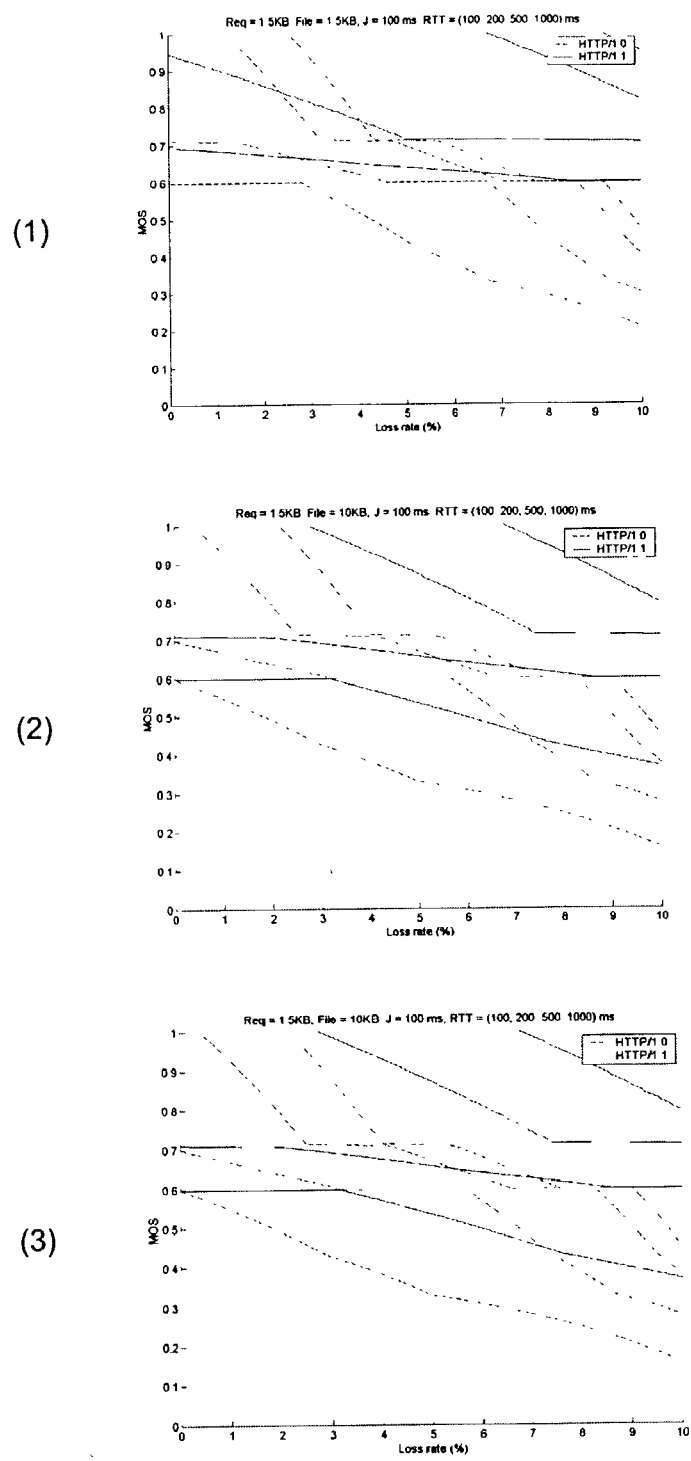
FIG. 21 metric of a typical web transaction for different file sizes, given various round-trip times versus the loss rate, using either HTTP/1.0 or HTTP/1.1 of some embodiments.
Figure 22:
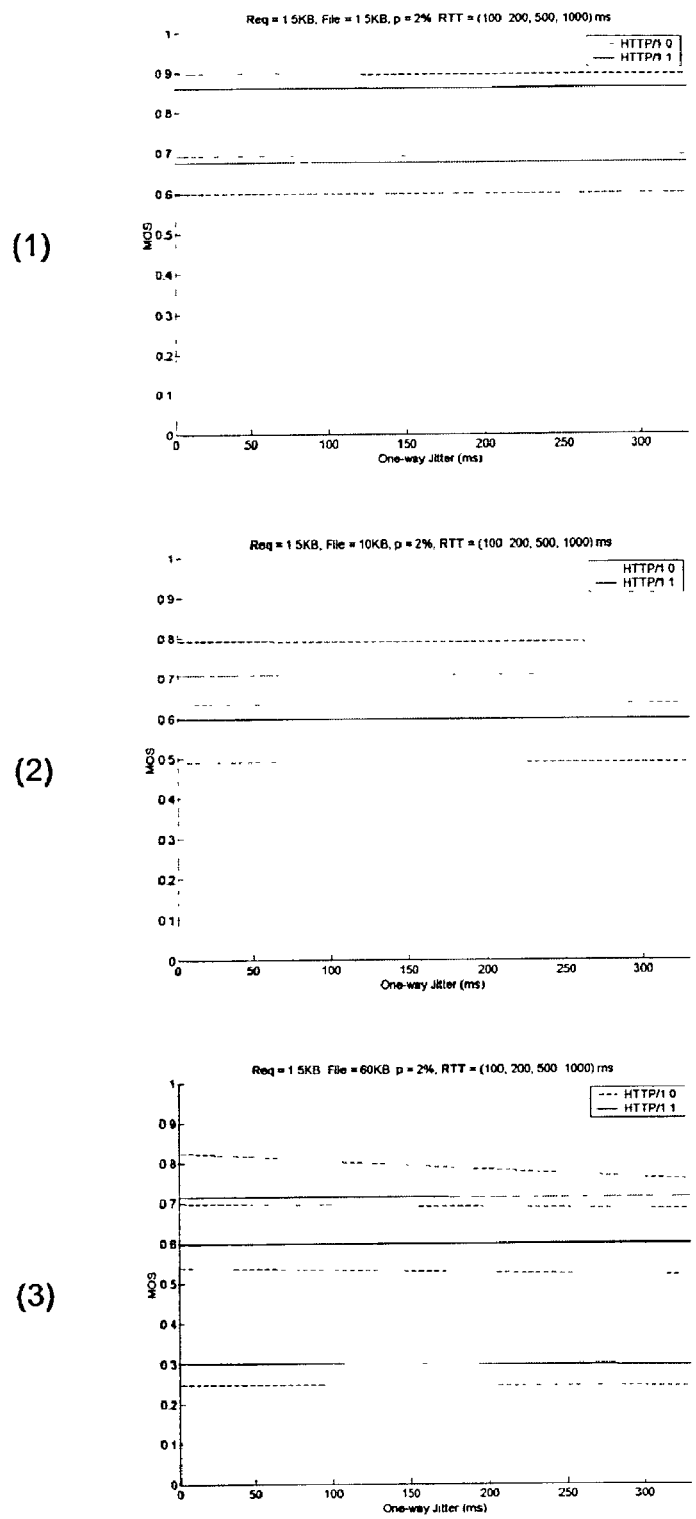
FIG. 22 metric of a typical web transaction for different file sizes, given various round-trip times versus one-way jitter, using either HTTP/1.0 or HTTP/1.1 of some embodiments.
Figure 23:
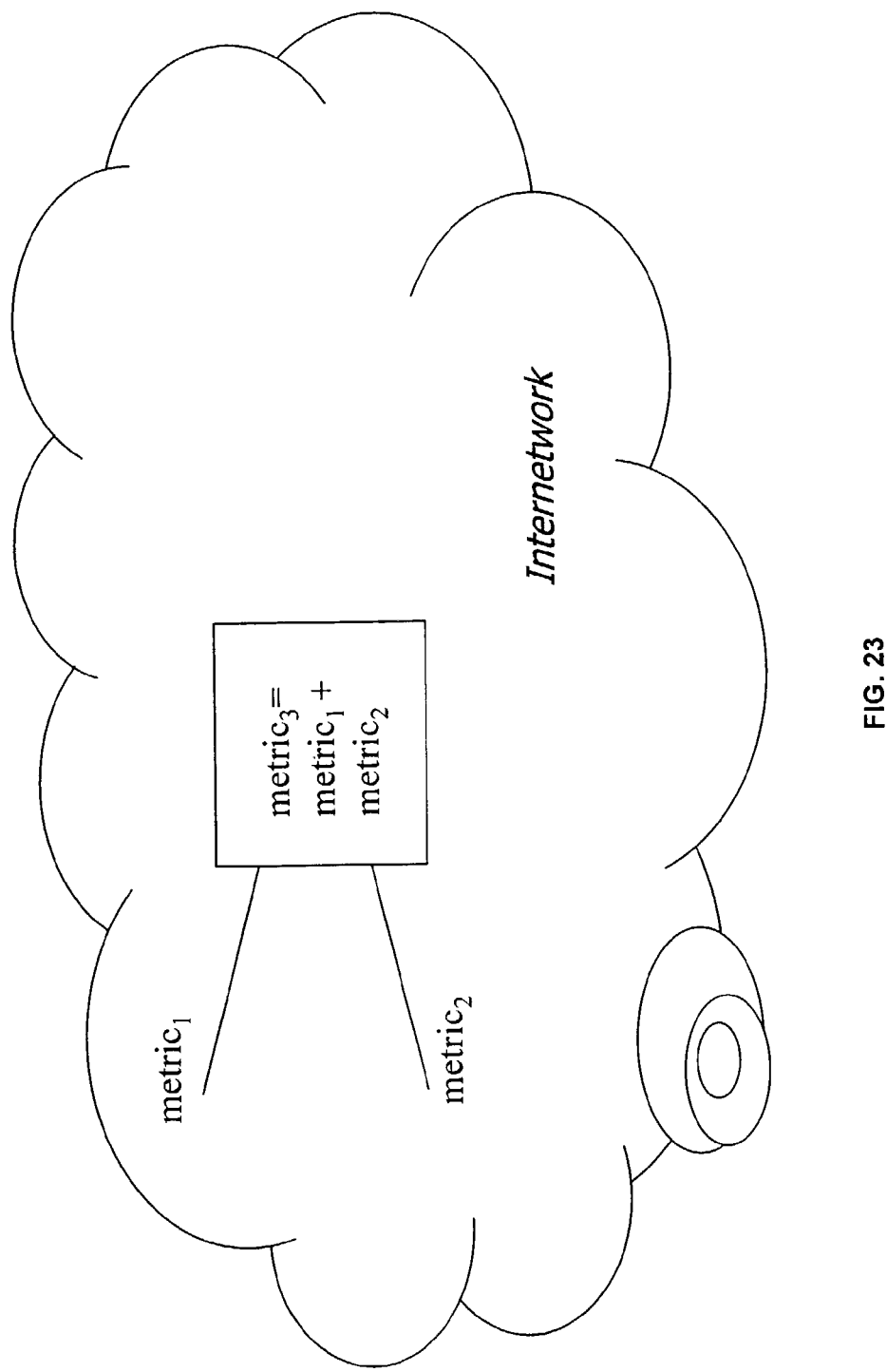
FIG. 23 network device of some embodiments deployed in a network.
Figure 24:
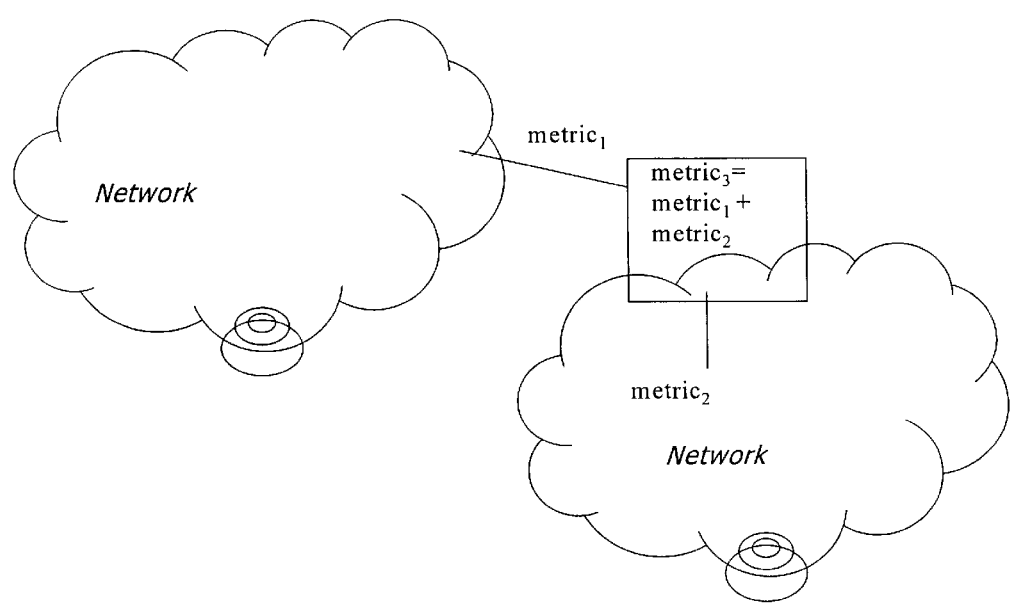
FIG. 24 network device of some embodiments deployed in an internetwork, at a point of presence between one or more networks.
Figure 25:
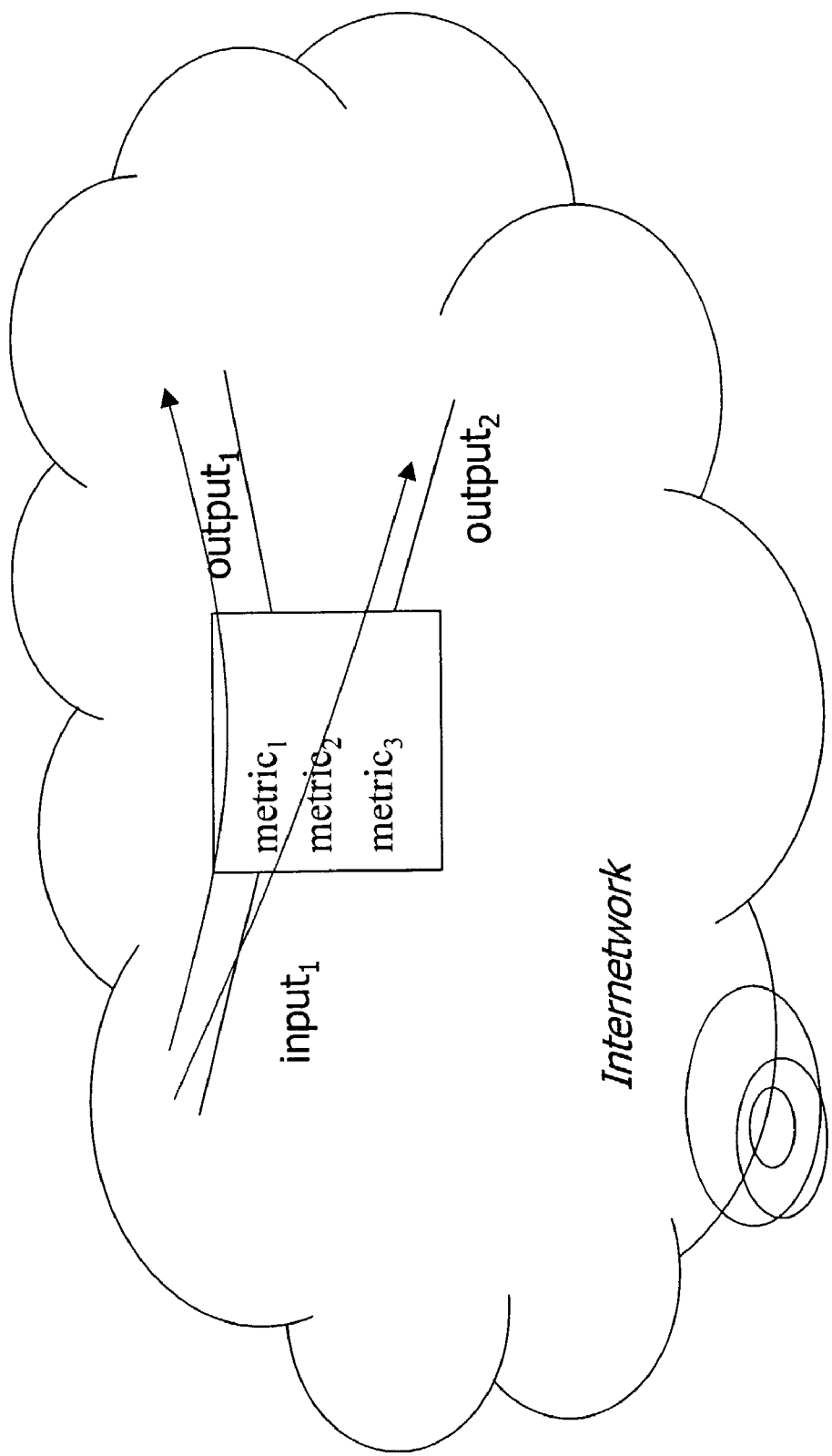
FIG. 25 network device of some embodiments used for routing deployed in an internetwork.
Figure 26:
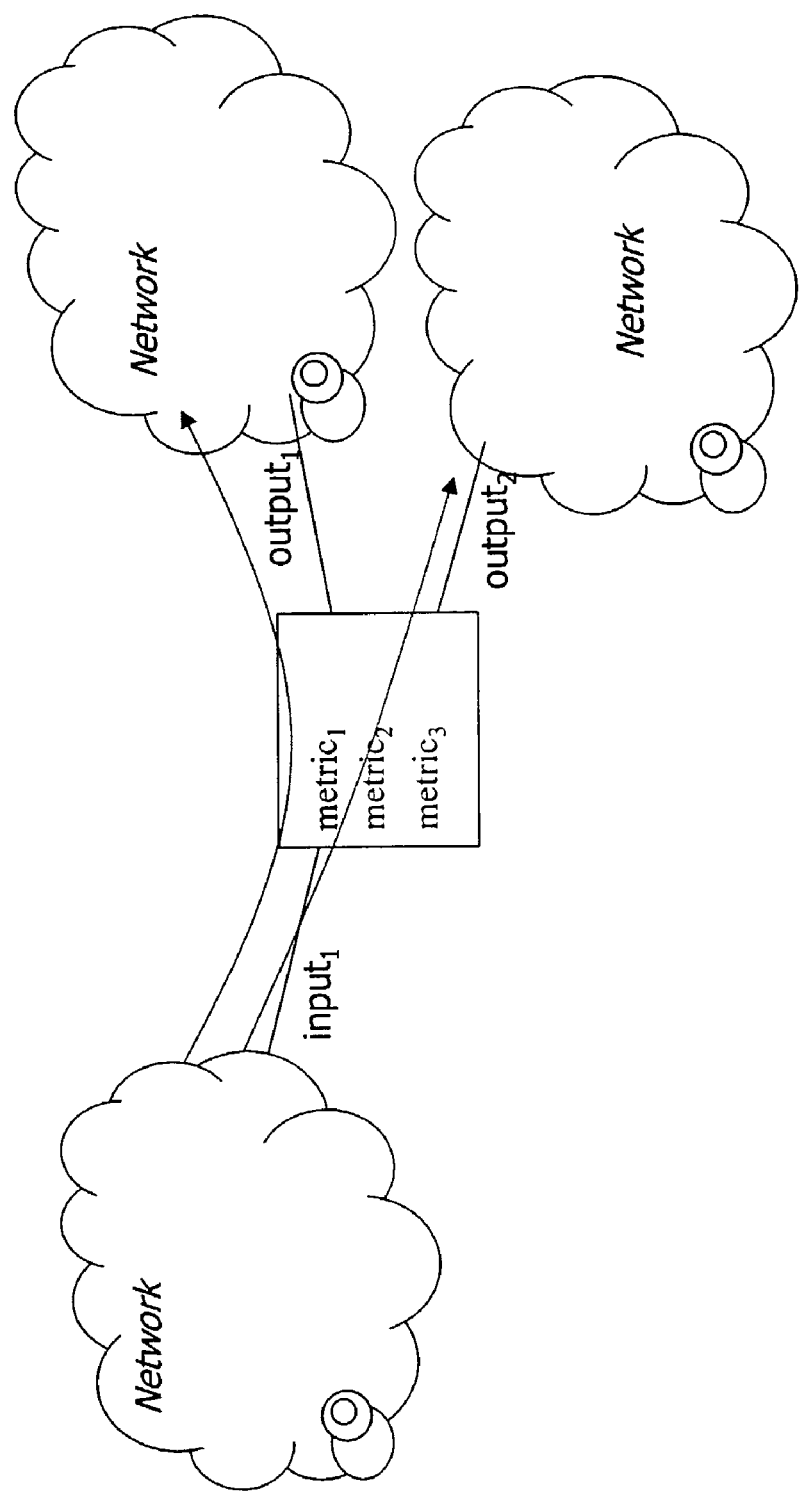
FIG. 26 network device of some embodiments used for routing, deployed in an internetwork, at a point of presence between one or more networks.
Figure 27:
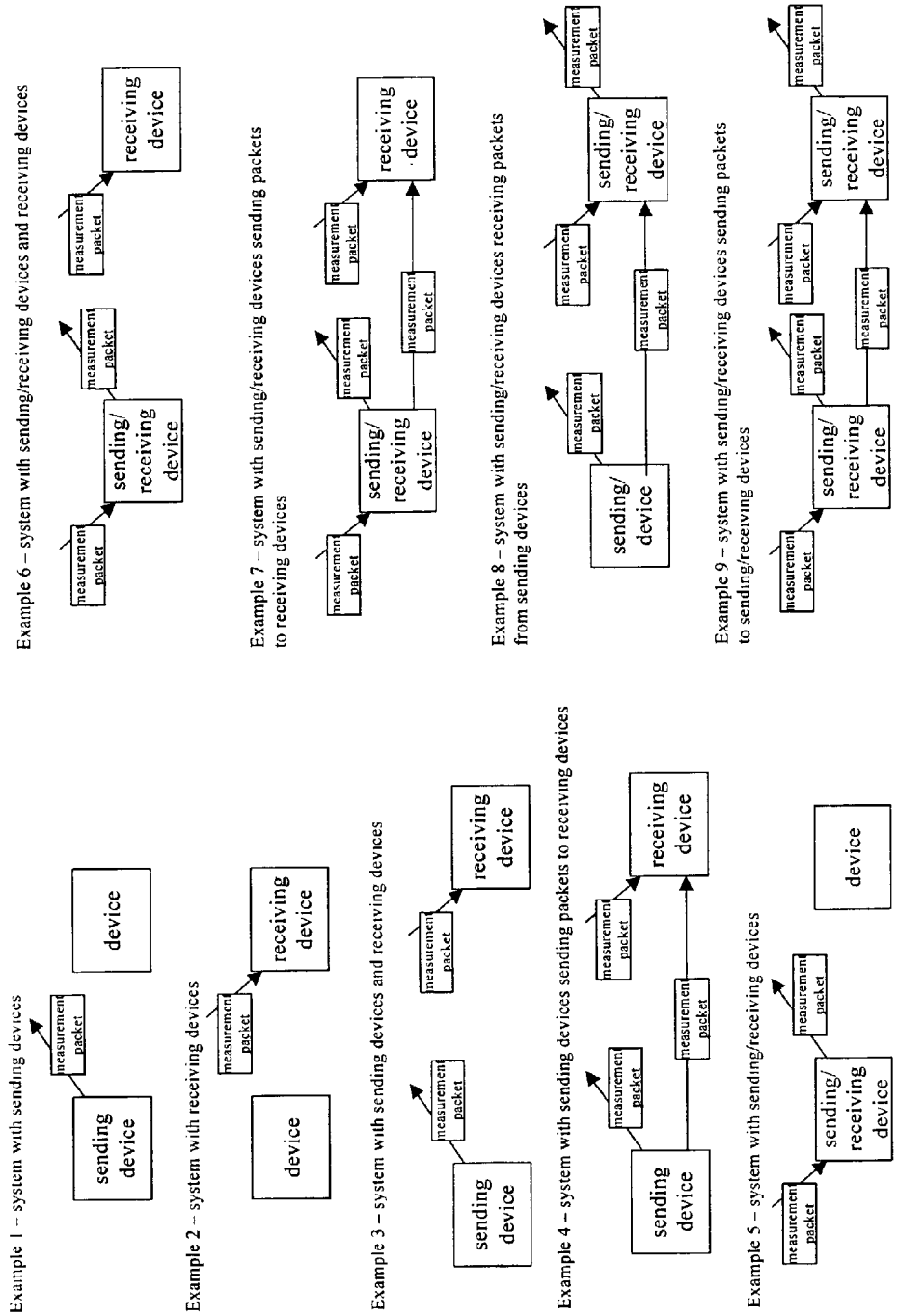
FIG. 27 shows some possible embodiments with devices that are communicating with each other, for example sending and receiving measurement packets.
Figure 28:
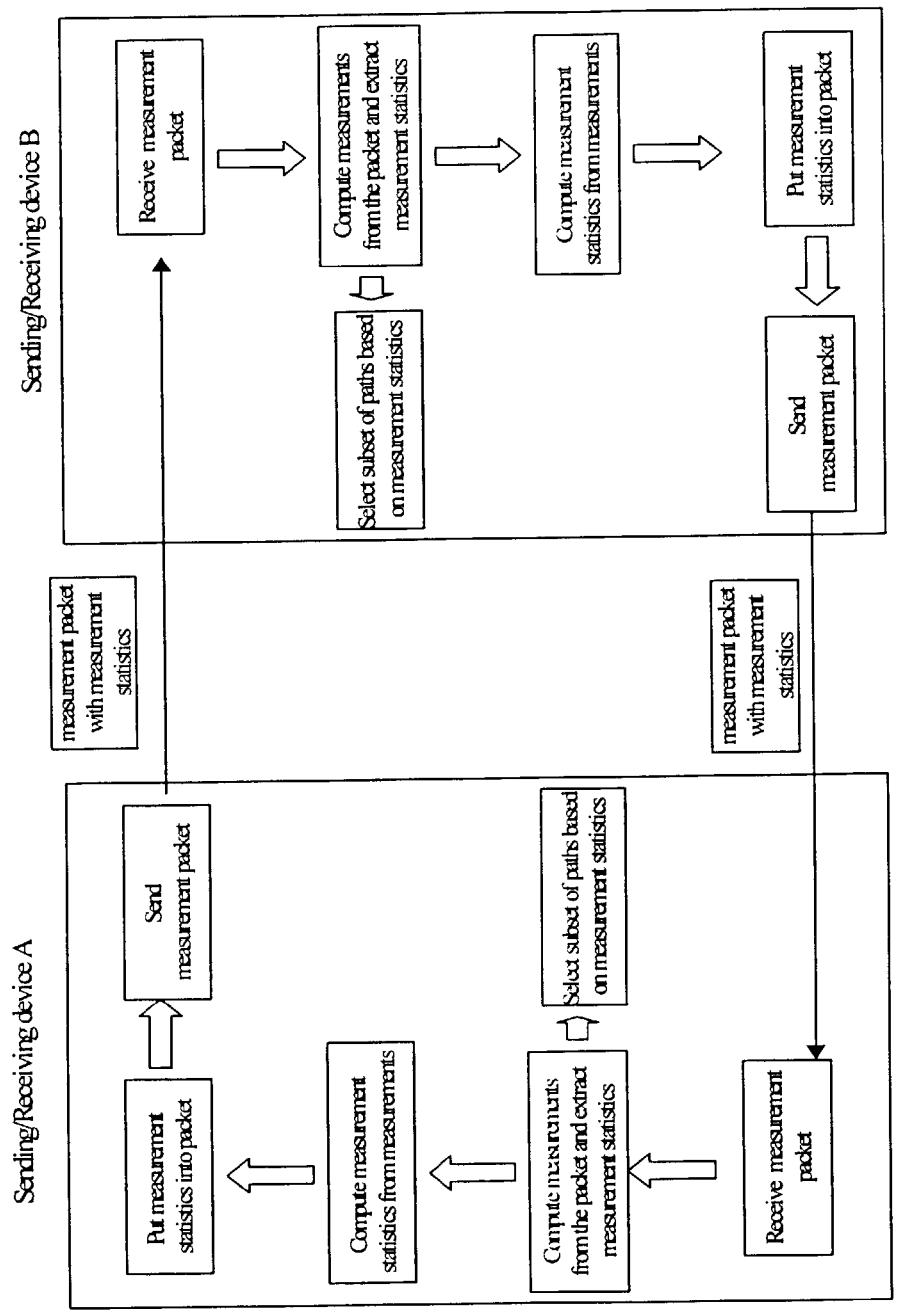
FIG. 28 shows one specific detailed embodiment with two devices, where each device is sending and receiving measurement packets as well as selecting a subset of paths.
Figure 29:
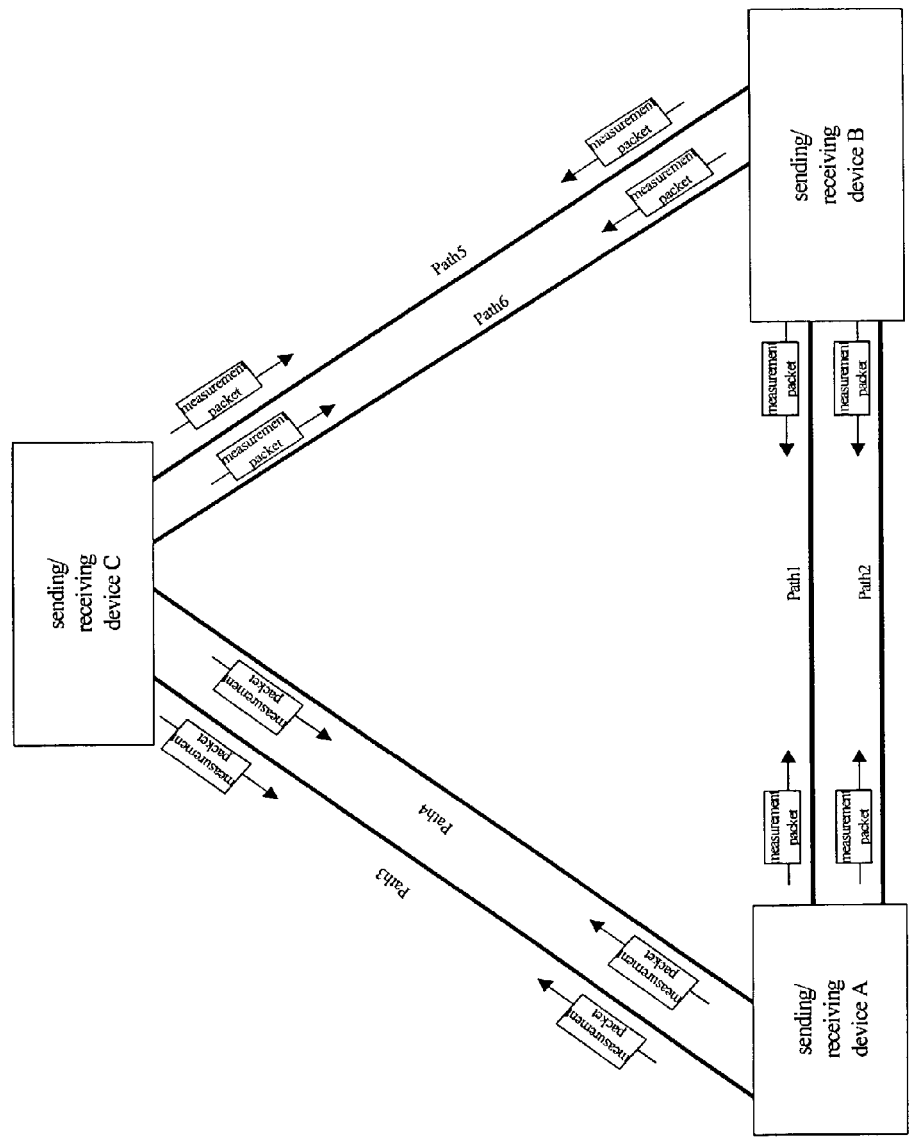
FIG. 29 shows an embodiment with more than two devices that are sending and receiving measurement packets to obtain measurements of performance characteristics of paths and to communicate measurements statistics about those paths.

In some embodiments, deriving the metric from the MOS value can comprise a step where the 1 to 5 MOS scale is normalized to a scale ranging from 0 to 1. In FIGS. 20-22, we present the resulting metric scores corresponding to the web transaction duration results shown in FIGS. 15-17, for some embodiments of this invention.

In some embodiments, such MOS functions can be used to derive metrics both for HTTP/1.0 and HTTP/1.1. For some embodiments, the following conclusions can be drawn, as observed from the metric graphs above:

For some embodiments, the effect of jitter is negligible.

In some embodiments, the effect of loss rate is not as large as one would expect. In fact, in some embodiments, TCP latency increases considerably as the loss rate increases from 2% to 10%. However, in some embodiments, what is important is the user perception. For example, even though an increase of latency from 100 ms to 2 seconds represents a 20-fold increase, this increase can, in some embodiments have a negligible effect of quality.

In some embodiments, The results also show that the file size affects the metric significantly, which, in these embodiments, is expected. In some embodiments, if the focus is on web transfers of the transactional type, then file sizes of up to 10 KBytes may be considered.

In some embodiments, the version of HTTP used has a surprisingly high effect on the results. In some embodiments, this is especially the case when loss rate is high (that is, larger than 5%). In some embodiments, the reason for this behavior is, again, the fact that the effective loss rate incurred in one embodiment with HTTP/1.0 is four times that incurred with HTTP/1.1.

An Additive Embodiment of HTTP/1.0 and HTTP/1.1 Metrics

In some embodiments of this invention, it is desirable to derive metrics for HTTP/1.0 and HTTP/1.1 that are additive (in the sense described above). In this section, we describe such embodiments.

The metrics derived here match for some embodiments, those shown graphically in the previous section for a wide range of the elementary dynamic parameters of delay, jitter, and loss. Those skilled in the art can use the same methodology to derive similar metrics with different parameters. Let a, b, c, and d be parameters that can be tailored to the particular application. The embodiments described here correspond to HTTP/1.0 and HTTP/1.1, respectively:

For HTTP/1.0, a=1.18, b=0.13, c=0.15, and d=0.25;
Fpr HTTP/1.1, a=1.30, b=0.31,c=0.41,and d=1.00.
Let
x=−(20.0/9.0)*(b−c);
y=(1.0/9.0)*(10.0*c−b);
Let $p_{max}$=x×delay+y (where delay is the delay in seconds).
Let loss be a measure of loss on the path.
if (loss <$p_{max}$/d), then metricLoss=1.0−log(1.0−loss/d)/log(1 1.0−$p_{max}$/d)
if (loss ≧$p_{max}$/d), metricLoss=0.0;
metricDelay=1.0−(delay)/a
Let metric denote the metric derived for the application; then for this embodiment, the value of metric is obtained as follows:

If (metricLoss+mosDelay>1.0), metric=metricLoss+metricDelay−1.0
If (metricLoss+mosDelay≦1.0), metric=0.0.

The metric value shown in these embodiments is clearly additive, in the sense described above. Those skilled in the art can derive additive metrics for other applications using different parameters, or different values of these parameters, following the methodology described above.

In some embodiments, the metric can, in addition to being performance related (as described above), can include non-performance related characteristics; in some embodiments, the non-performance related can include pre-specified route preferences.

Apparatus for Characterizing the Quality of a Network Path

In this final section, we describe some embodiments of network devices that characterize the quality of network paths and use these in the process of routing. Effectively, such a network device configured, such that if the network device is connected to at least a network path including a first segment and a second segment, the network device performs:

1. accessing a first metric and a second metric,
    wherein the first metric and the second metric are at least in part quality characterizations of a same plurality of one or more network applications, wherein the quality characterization characterizes a quality of the same plurality of one or more network applications running at one or more segment end-points
    wherein the first metric and the second metric are at least partly a function of a same plurality of one or more elementary network parameters, wherein the plurality of one or more network parameters include one or more of delay, jitter, loss, currently available bandwidth, and intrinsic bandwidth
    wherein the first metric is at least partly the function of the same plurality of elementary network parameters of the first segment, wherein the one or more segment end points include one or more end-points of the first segment
    wherein the second metric is at least partly the function of the same plurality of elementary network parameters of the second segment, wherein the one or more segment end points include one or more end-points of the second segment
2. adding the first metric and the second metric to generate a third metric, wherein
    the third metric is at least partly the function of the same plurality of one or more elementary network parameters of the network path, wherein the one or more segment end points include one or more end-points of the network path
    the third metric is a quality characterization of the same plurality of one or more applications In some embodiments, the network device further performs:
    prior to accessing the first or the second metric, generating at least one of the first metric and the second metric In some embodiments, the network device further performs:
    prior to accessing the first or the second metric, receiving at least one of the first metric and the second metric In some embodiments, the network device deals with a plurality of one or more network parameters that is dynamic. In other embodiments, the network device is such that at least one of the plurality of one or more network parameters is static.

As described in the method sections, the plurality of one or more network applications include at least one of UDP and TCP applications. UDP applications include voice, video, whereas video applications include video conferencing. In some embodiments, TCP applications include HTTP, whereas HTTP applications include HTTP/1.0 and HTTP/1.1. In some embodiments, TCP applications include ftp and telnet.

In some embodiments, the network device is such that the plurality of one or more network parameters include delay, jitter, loss, currently available bandwidth and intrinsic bandwidth.

In some embodiments, the metric can, in addition to being performance related (as described above), can include non-performance related characteristics; in some embodiments, the non-performance related can include pre-specified route preferences.

In some embodiments, the network device further comprises:
- a plurality of one or more inputs adapted to be coupled to the network path,
- a plurality of one or more outputs coupled to the plurality of one or more inputs, wherein, responsive to a plurality of one or more packets arriving to the network device through the plurality of one or more inputs, the network device selects at least one output from the plurality of one or more outputs, wherein the at least one output is determined at least partly using at least one of the first metric, second metric, and third metric.

Measurement Packets

A measurement packet is a packet sent by a sender over an internetwork that includes information necessary for the receiver of the packet to compute measurements of the performance characteristics of the path the packet has traversed over that internetwork. The information includes information for a receiver of the measurement packet to compute measurements of performance characteristics of at least a portion of the path of the measurement packet; and data including one or more of measurement statistics, a generic communication channel, network information, and control data directing a receiver of the measurement packet to change one or more configuration parameters of the receiver.

In some embodiments of the invention, the information included in the measurement packet to compute measurements includes at least one of a timestamp of a sending time of the packet and a number to identify the packet by itself and/to identify the relative position of the measurement packet in a sequence of measurement packets.

In some embodiments of the invention, the measurement packet is implemented using the following data structure:

```
struct MeasurementHeader {
    /**
     * A generation number. This value represents when the
     * sender began sending. This value is a standard Unix
     * timestamp that seconds since Jan 1, 1970 UTC.
     **/
    uint32_t mGeneration;
    /**
     * A sequence number for the packet. This increments each
     * time a packet is sent and rolls over when 16 bits is
     * exceeded.
     **/
    uint16_t mSequence;
    /**
     * The IP address the packet is sent to.
```

-continued

```
     **/
    uint32_t mDstAddr;
    /**
     * The send timestamp for this packet.
     **/
    uint64_t mSendTime;
};
```

The mGeneration field is used to detect when a sending process has started a new session. This field is used by the receiver to determine that a discontinuity in the stream's sequence numbers is the result of a sender restart, rather than due to large network latencies, duplicate packets or dropped packets.

The sequence number mSequence field is incremented by one each time a packet is sent. This approach allows the receiver to deduce lost and duplicate packets by identifying missing and duplicate sequence numbers.

The mSendTime field contains the time at which the packet was sent, represented as microseconds since Jan. 1, 1970 UTC. This field is compared to the time the packet arrived at the receiver to determine the delay between the sender and the receiver.

In some embodiments of the invention, a plurality of one or more packets are sent over a path continuously. In some embodiments of the invention, the continuous stream of packet is denoted as a measurement stream. Each measurement stream is uniquely identified by the source and destination IP addresses. The sender maintains one socket descriptor for each source IP address it sends from and writes the destination IP address into the mDstAddr field. On the receiver side, the source IP address is returned by the recv( ) system call and the destination address is retrieved from the measurement packet.

Data Included in the Measurement Packets

In measurement packets that contain sufficient space, data will be included, including one or more of measurement statistics, a generic communication channel, network information, and control data directing a receiver of the measurement packet to change one or more configuration parameters of the receiver.

Some embodiments of the invention will add a single type of data to each packet. Some embodiments of the invention will use a complex data, including subpackets.

Some embodiments of the invention use subpackets that include a single byte subpacket type identifier, followed by a 2-byte length field (including the length of the type and length fields) and finally including the data that is to be sent. One embodiment will store all values in network byte order. Other byte orders will be apparent to those skilled in the art. The following data structure definition describes some embodiments.

```
class SubPacket {
    /*
     * The type identifier for this subpacket.
     */
    uint8_t mType;
    /*
     * The length of this subpacket, in network byte order.
     */
    uint16_t mLength;
};
```

One embodiment of this invention will include data describing a momentary snapshot of the measurement statistics for a given path between a sender and a receiver.

In some embodiments of this invention, this data will include one or more of the following information: the source and destination IP addresses that define the path, a measurement packet size for which the statistics have been calculated as well as computed measurement statistics that are at least partly responsive to delay; computed measurement statistics that are at least partly responsive to jitter and computed measurement statistics that are at least partly responsive to packet loss.

In one embodiment of this invention, these statistics will be in units of microseconds expressed as 64-bit floating-point quantities and transmitted in a standard network byte order.

In one embodiment of this invention, the following data structure will store the computed statistics:

```
class TunnelStatsSubPacket : public SubPacket {
    /**
     * The time that this statistic snapshot was taken (in
     * microseconds since 1970),
     **/
    uint64_t mTimestamp;
    /**
     * The source IP address of the tunnel these statistics
    apply
     * to.
     **/
    uint32_t mSrcAddr;
    /**
     * The destination IP address of the tunnel these
    statistics
     * apply to.
     **/
    uint32_t mDstAddr;
    /**
     * The size of measurement packet that these statistics
    apply
     * to. A size of 0 indicates that these statistics
    apply to
     * all packet sizes.
     **/
    uint16_t mPktSize;
    /**
     * The average delay in microseconds.
     **/
    double mDelay;
    /**
     * The average jitter in microseconds.
     **/
    double mJitter;
    /**
     * The percentage of packets that have been lost, in the
    range
     * 0 to 1.
     **/
    double mLoss;
};
```

Some embodiments of this invention include the time at which the statistics were computed such that those statistics are sent over multiple paths for improved reliability and to take advantage of one path having less delay than another. One embodiment at the receiving end is able to compare the computation times of received statistics to place them in their original temporal order, regardless of their relative arrival times over the paths.

Some embodiments of this invention will send computed statistics specific to the paths that are part of the plurality of one or more paths that are between the specific sender and receiver. Other embodiments will send additional computed statistics for paths that are not one of the plurality of one or more paths that are between the specific sender and receiver.

Some embodiments of this invention will include network information concerning network topology including but not limited to information retrieved from routers such as in-bound or out-bound link utilization, inbound or outbound link bandwidth and/or CPU utilization. Other network information determined from routers and other network devices will be apparent to someone skilled in the art.

Some embodiments of this invention will also include control data directing a receiver of the measurement packet to change one or more configuration parameters of the receiver.

In some embodiments of the invention, the control data will instruct a receiver to alter its configuration, including but not limited to zero or more of the following examples: instructing a receiver to initiate sending a plurality of one or more measurement packets, change one or more of the measurement packet sizes, inter-measurement packet transmission times and mix of packet sizes, and stop sending one or more of the plurality of measurement packets.

In some embodiments of the invention, this control information will include notification of measurement devices that have joined or left the network.

In many embodiments of the invention, the measurement packets will be encrypted by the sender and decrypted by the receiver. Some of these embodiments will use IPSec.

In some embodiments of the invention, the encryption and decryption will be done by an external device using IPSec.

Other encryption and decryption options will be apparent to one skilled in the art.

In some embodiments of the invention, the measurement packets will be digitally signed.

In some embodiments of the invention, a generic communication channel will be used by a sender and a receiver to communicate data between them.

Performance Characteristics of a Path

Measurements are used to compute performance characteristics of the paths traversed by the measurement packets. The measurements can either be computed from the measurement packets themselves, or extracted from the arbitrary data carried by the measurement packets. The measurements of performance characteristics include at least one or more of one-way measurements and round-trip measurements. The performance characteristics include at least one or more reachability, delay, jitter, loss, available bandwidth, and total bandwidth. Other performance characteristics will be apparent to those skilled in the art.

In some embodiments of the invention, delay measurements are computed as the interval of time from the moment the measurement packet is sent by the sender to the moment of time the measurement packet is received by the receiver. The sending time is carried by the packet, and it is measured by the clock the sender refers to. The receiving time is measured by a clock that the receiver refers to, which may or may not be synchronized with the sender's clock.

In some embodiments of the invention, the clock of the sender and the clock of the receiver are synchronized. A plurality of one or more precise clock inputs such as GPS, NTP, IRIG and NIST will be used. Some embodiments of this invention will use the same clock as an input to more than one of the plurality of one or more senders and receivers. In some embodiments of the invention, the clock of the sender and the clock of the receiver are the same.

In some embodiments of the invention, the clock of the sender and the clock of the receiver are not synchronized, and mechanisms based on the measurement data are used to correct the clock skew and clock drift, the mechanisms including using minimum delay across multiple measurement samples, and using a mechanism to track the minimum delay over time.

Some embodiments of the invention will use the minimum round-trip delay between the devices to place a lower bound on clock skew.

Some embodiments of the invention will use the lower bound of multiple paths between the sender and receiver to further reduce the lower bound.

Some embodiments of the invention will correct for clock drift by tracking the relative clock skew between the sender and receiver over time and adjusting for the slope of the drift.

In some embodiments of the invention, jitter measurements, also known as inter-measurement packet delay variations, are computed as the difference in delay on consecutive, successfully received packets.

In some embodiments of the invention, jitter can also be computed as the difference between the instantaneous delay of a packet, and the average delay of all the measurement packets previously received.

In some embodiments of the invention, loss measurements are computed by assigning a timeout value to each measurement packet that indicates the instant of time after which the measurement packet will be declared lost, if the packet has not arrived by that time. In some embodiments of the invention, the timeout value of a measurement packet can be computed with the transmission time of a previously received packet, an estimation of the inter-transmission time between measurement packet, and an estimation of the transmission delay of the measurement packet. In some embodiments of the invention, the inter-transmission time can be estimated if the receiver knows about the scheduling pattern of transmission of measurement packets. In some embodiments of the invention, the transmission delay of packet can be estimated based on delay and jitter performance characteristics.

Performance characteristics of a path could be the measurement themselves, or statistics on those measurements. In the statistics case, a dynamic algorithm is used to updates the statistics associated with a path with every new measurement obtained with the arrival of every new packet over the path.

In some embodiments of the invention, the algorithm computes statistics over the performance characteristics of the path.

In some embodiments of the invention, the statistics include averages, deviations, and variances. Other statistics will be apparent to those skilled in the art. In some embodiments of the invention, averages can be computed using a plurality of one or more techniques including a moving average, an average based on the Robbins-Moro estimator, a window-based average or a bucket-based average. Other techniques to compute averages will be apparent to those skilled in the art.

In some embodiments of the invention, the moving average is an exponentially moving average computed using a Robbins-Moro estimator. The Robbins-Moro stochastic approximation estimator finds a solution of the equation:

$$E[f(t)-x]=0$$

where E is the expectation, f(t) a function and x the estimator. The general form of the solution is:

$$x(t)=x(t-1)+\text{alpha}*[f(t)-x(t-1)]=(1-\text{alpha})*x(t-1)+\text{alpha}*f(t)$$

or, with alpha=$(1-\mu)$, $$x=\mu*x+(1-\mu)*f$$

$\mu$ is the weight of the estimator, and determines the amount contributed to the average by the function. In some embodiments of the invention, $\mu$ is constant. In some embodiments of the invention, $\mu$ is a dynamic value, whose value depends on the last value of the function f according to the formula:

$$\mu=e^{\wedge}(-f/K)$$

where K is a constant that also determines the importance of the last value off with respect to the current value of the estimator x.

In some embodiments of the invention, average delay can be computed using an exponentially moving average as follows, $$d=\mu*d+(1-\mu)*m$$

where d is the exponentially moving average of delay, m is the last delay sample, and $\mu$ is the weight of the moving average.

In some embodiments of the invention, average jitter can be computed using an exponentially moving average as follows, $$v=\mu*v+(1-\mu)*|d-m|$$

where v is the exponentially moving average of jitter, |d−m| is the last sample of jitter, and $\mu$ is the weight of the average.

In some embodiments of the invention, average jitter can be computed using an exponentially moving average as follows, $$v=\mu*v+(1-\mu)*|m-m'|$$

Where v is the exponentially moving average of jitter, |m−m'| is the last sample of jitter, m is the last delay sample, m' is the previous delay sample, and $\mu$ is the weight of the average.

In some embodiments of the invention, delay and jitter averages can be combined into a single value as follows:

$$l=d+M*v$$

Where d is the average delay, v is the average jitter and M is a constant.

In some embodiments of the invention, average loss can be computed using an exponentially moving average as follows, $$p\text{-hat}=\mu*p\text{-hat}+(1-\mu)*p$$

where p-hat is the moving average of the loss, p={0 if packet is received, 1 is the packet is declared lost}, and $\mu$ is the weight of the exponentially moving average.

In some embodiments of the invention, $\mu$ is determined based on the notion of forgiveness against a single packet loss. The forgiveness period is the interval of time between the time the packet loss occurs and the time the average loss is forgiven. The forgiveness period can be either defined in units of time, or in number of packets if the rate of the monitoring flow is known. That is, the forgiveness period will end after n consecutive packets have been received after the loss, when these packets have been transmitted at a certain rate.

The value of the exponentially moving average after receiving the n packets is needed before $\mu$ can be determined, and this value is known as the forgiveness threshold. In some embodiments of the invention, the forgiveness threshold is chosen arbitrarily. In some embodiments of the invention, the forgiveness threshold takes the value:

$$\tfrac{1}{2}(1-\mu)$$

This value is half of the value of the estimator after the singe loss occurs, and thus we call it the half-life threshold. Similarly, we also call the forgiveness period under this threshold the half-life period. The advantage of using a forgiveness threshold greater than zero is that issues related to host-dependent floating-point representations reaching that value are avoided.

In some embodiments of the invention, $\mu$ is computed by comparing the value of the estimator after n consecutive packet arrivals since the loss with the half-life threshold:

$$p\text{-}hat=(1-\mu)*\mu\char`\^n<\tfrac{1}{2}(1-\mu)$$

Given that n is known because is determined by the value of the half-life period and the transmission rate, $\mu$ is computed as:

$$\mu=exp((\ln\tfrac{1}{2})/n)$$

In some embodiments of the invention, two thresholds are defined, an upper threshold and a lower threshold. When the value of p-hat exceeds the upper threshold, the loss is not forgiven until enough measurement packets are received consecutively so that the value of p-hat gets below the lower threshold.

Other mechanisms to compute $\mu$ will be apparent to for those skilled in the art.

Path Description

In some embodiments of the invention, the path traversed by the measurement packets from the sender to the receiver is such that the path is at least partly implemented with at least one of a GRE tunnel, an IPSEC tunnel and IPonIP tunnel. Other path implementations using tunnel will be apparent for those skilled in the art.

In some embodiments of the invention, the path traversed by the measurement packets from the sender to the receiver is implemented with a virtual circuit, including a frame relay PVC, an ATM PVC or MPLS. Other path implementations using virtual circuits will be apparent for those skilled in the art.

Other path implementations will be apparent to those skilled in the art.

Internetwork Description

In some embodiments of the invention, the internetwork is implemented by a plurality of one or more subnetworks, including a plurality of one or more VPNs, a plurality of one or more BGP autonomous systems, a plurality of one or more local area networks, a plurality of one or metropolitan area networks, and a plurality of one or morewide area networks.

In some embodiments of the invention, the internetwork is implemented by an overlay network.

Other internetwork implementations will be apparent to those skilled in the art.

Packet Sizes and Transmission Times

In some embodiments of the invention, the measurement packets are of varying sizes, including 64, 256, 512, 1024, 1500 bytes.

In some embodiments of the invention, the size of the measurement packets is specified with an external API.

In some embodiments of the invention, the measurement packets are of a fixed size.

In some embodiments of the invention, the measurement packet sizes and times between measurement packets simulate the traffic pattern of a plurality of one or more applications In some embodiments of the invention, traffic patterns correspond to voice applications, where the packets re of small size, e.g., 30 bytes, and the inter-transmission time between consecutive packets is constant, e.g., 10 ms. These examples do not limit the possible size values and inter-transmission time values.

In some embodiments of the invention, traffic patterns correspond to video applications, where the packets size is the largest permitted to be transmitted by an internetwork without being fragmented, and the inter-transmission time between consecutive packets varies depending on the spatial and temporal complexity of the video content being transmitted, the compression scheme, the encoding control scheme.

In some embodiments of the invention, traffic patterns correspond to the plurality of applications observed in an internetwork, including at least one or more of HTTP transactions, FTP downloads, IRC communications, NNTP exchanges, streaming video sessions, VoIP sessions, video-conferencing sessions and e-commerce transactions. Other types of applications will be apparent to those skilled in the art.

In some embodiments of the invention, the inter-measurement packet transmission times are of varying length.

In some embodiments of the invention, the inter-measurement packet transmission times are of fixed length.

In some embodiments of the invention, the inter-measurement packet transmission times specified with an external API.

In some embodiments of the invention, the length of the inter-measurement packet transmission times is randomized according to a distribution. In some embodiments of the invention, this distribution is based at least in part on a uniform distribution. In some embodiments of the invention, this distribution is based at least in part on an exponential distribution. In some embodiments of the invention, this distribution is based at least in part on a geometric distribution. Other distributions will be apparent to those skilled in the art.

In some embodiments of the invention, the length of the inter-measurement packet transmission times is provided by a table.

In some embodiments of the invention, the length of the inter-measurement packet transmission times is controlled by a scheduler. In some embodiments of the invention, the scheduler uses a priority queue, keyed on desired send time.

Other mechanisms to specify the inter-measurement packet transmission time will be apparent to those skilled in the art.

Other packet sizes and transmission times will be apparent to those skilled in the art.

Path Selection

It is possible that multiple alternative paths between a sender and a receiver are available through an internetwork at any given moment. Performance characteristics of each of these paths can be used to select a subset of the paths.

In some embodiments of the invention, the subset of the plurality of paths is selected based at least in part on at least one of: one or more of the measurement statistics from the measurement packet and one or more of the computed statistics.

In some embodiments of the invention, the selection of the subset of the plurality of paths is based at least partly on the position of paths in a ranking. In some embodiments of the invention, the ranking is at least partly based on one or more of the measurement statistics included as data in the measurement packet. In some embodiments of the invention the ranking is at least partly based on the computed statistics of the path. In some embodiments of the invention the ranking is implemented by using a comparison function to compare the paths, and by ordering the paths in a decreasing order. In some embodiments of the invention the ranking is implemented by using a comparison function to compare the paths, and by ordering the paths in an increasing order. Other ranking techniques will be apparent to those skilled in the art.

In some embodiments of the invention, the ranking is based on a single score associated to each path. In some embodiments of the invention, this score is denoted Magic Score (MS), and it is computed as follows:

$$MS=ML*MF$$

$$ML=d+M*v$$

$$MF=\text{delta}*p\text{-}hat+1$$

where ML is the Magic Latency, a component of the MS obtained using delay and jitter respectively calculated with statistics; and MF is the Magic scaling Factor that multiplies the value of ML, and is computed based on loss statistics. M is a constant that takes several values, including 4, for example. MS can be seen as a scaled-up version of ML, and the scaling factor MF is a function of p-hat and delta, a constant. As p-hat not only reflects loss but also detects large delay spikes before they happen, p-hat can be seen as an indicator of the departure of the path from a "normal mode" operation, and thus the scaling factor is only applied when there are loss or spikes. The goal of MF is to differentiate between paths that have very similar delay characteristics, but with one having losses and the other not having them.

In some embodiments of the invention, ML is used as a delay indicator, given that jitter is accounted as an increase in delay. In contrast, MS, although a scaled version of ML, cannot be used to indicate delay, except when MF=1(p-hat=0), which leads to MS=ML. That means the value of MS is useful not by itself but to compare it with the MSs of other tunnels.

In some embodiments of the invention, loss statistics can be used as a discriminator instead of a scaling factor. That is, p-hat can eliminate paths experimenting loss. Then, the remaining paths can be selected using MS=ML.

In some embodiments of the invention, the selection of a subset of paths is based on applying at least one or more thresholds to at least one of more of the statistics.

In some embodiments of the invention, a single threshold is used, and computed as a certain percentage of the highest score of the paths. In some embodiments of the invention, the threshold is determined by subtracting a fixed quantity to the highest score of the paths.

In some embodiments of the invention, the number of paths in the subset of paths is fixed. In some embodiments of the invention, this fixed number of paths N out of M paths is determined such that the probability of having loss in (M−N) paths simultaneously is less than a certain threshold. In some embodiments of the invention, this probability is a binomial, with the assumption that all paths have the same probability of loss.

In some embodiments of the invention, the selection of the subset of the plurality of paths is based at least partly on a probability associated with each path. In some embodiments of the invention, the probability of each path is at least partly based on one or more of the measurement statistics included as data in the measurement packet.

In some embodiments of the invention, the probabilities of each path are equal.

In some embodiments of the invention, the selection of the subset of the plurality of paths is based at least partly on the cost of the path.

In some embodiments of the invention, the selection of the subset of the plurality of paths is based at least partly on the amount of bandwidth consumed over a period of time.

Other possibilities to compute path probabilities will be apparent to those skilled in the art.

Other mechanisms to select a subset of the paths will be apparent to those skilled in the art.

What is claimed is:

1. A method for characterizing a quality of a network path, including a first segment and a second segment, the method comprising:

modeling, by at least one network device, negative linear exponential equations for deriving first and second metrics, wherein modeling one of the negative linear exponential equations comprises determining a first parameter of the negative exponential equation corresponding to underestimating a quality characterization, determining a second parameter of the negative exponential equation corresponding to overestimating the corresponding quality characterization, and determining a third parameter from an average of the first and second parameters;

wherein the first and second metrics are at least in part quality characterizations of a same plurality of one or more network applications;

accessing the first metric and the second metric, the quality characterization characterizes a quality of the same plurality of one or more network applications running at one or more segment end-points, the first metric and the second metric are at least partly a function of a same plurality of one or more elementary network parameters, the plurality of one or more network parameters include one or more of delay, jitter, loss, currently available bandwidth, and intrinsic bandwidth, the first metric is at least partly the function of the same plurality of network parameters of the first segment, the one or more segment end points include one or more endpoints of the first segment, the second metric is at least partly the function of the same plurality of network parameters of the second segment, and the one or more segment end points include one or more endpoints of the second segment; and adding the first metric and the second metric to generate a third metric, wherein the third metric is at least partly the function of the same plurality of one or more network parameters of the network path, the one or more segment end points include one or more endpoints of the network path, and the third metric is a quality characterization of the same plurality of one or more applications.

2. The method of claim 1, further comprising:
prior to accessing the first or the second metric, generating at least one of the first metric and the second metric.

3. The method of claim 1, further comprising:
prior to accessing the first or the second metric, receiving at least one of the first metric and the second metric.

4. The method of claim 1, wherein at least one of the plurality of one or more network parameters is dynamic.

5. The method of claim 1, wherein at least one of the plurality of one or more network parameters is static.

6. The method of claim 1, wherein the plurality of one or more network applications include at least one of UDP and TCP applications.

7. The method of claim 6, wherein the plurality of one or more network applications include UDP applications.

8. The method of claim 7, wherein the plurality of one or more network applications include voice.

9. The method of claim 7, wherein the plurality of one or more network applications include video.

10. The method of claim 9, wherein the plurality of one or more network applications include video conferencing.

11. The method of claim 6, wherein the plurality of one or more network applications include TCP applications.

12. The method of claim 11, wherein the plurality of one or more network applications include HTTP.

13. The method of claim 12, wherein the plurality of one or more network applications include one of HTTP/1.0 and HTTP/1.1.

14. The method of claim 11, wherein the plurality of one or more network applications include ftp.

15. The method of claim 11, wherein the plurality of one or more network applications include telnet.

16. The method of claim 1, wherein the plurality of one or more network parameters include delay.

17. The method of claim 1, wherein the plurality of one or more network parameters include jitter.

18. The method of claim 1, wherein the plurality of one or more network parameters include loss.

19. The method of claim 1, wherein the plurality of one or more network parameters include currently available bandwidth.

20. The method of claim 1, wherein the plurality of one or more network parameters include intrinsic bandwidth.

21. The method of claim 1, wherein the first, second, and third metrics include non-performance related characteristics.

22. The method of claim 21, wherein the non-performance related characteristics includes pre-specified route preferences.

23. A network system, comprising:
a plurality of one or more network devices configured, such that if the network device is coupled to at least a network path including a first segment and a second segment, the plurality of one or more network devices performing:
modeling, by one or more of the plurality of one or more network device, negative linear exponential equations for deriving first and second metrics, wherein modeling one of the negative linear exponential equations comprises determining a first parameter of the negative exponential equation corresponding to underestimating a quality characterization, determining a second parameter of the negative exponential equation corresponding to overestimating the corresponding quality characterization, and determining a third parameter from an average of the first and second parameters;
wherein the first and second metrics are at least in part quality characterizations of a same plurality of one or more network applications;
accessing the first metric and the second metric,
the quality characterization characterizes a quality of the same plurality of one or more network applications running at one or more segment end-points,
the first metric and the second metric are at least partly a function of a same plurality of one or more elementary network parameters,
the plurality of one or more network parameters include one or more of delay, jitter, loss, currently available bandwidth, and intrinsic bandwidth,
the first metric is at least partly the function of the same plurality of network parameters of the first segment,
the one or more segment end points include one or more endpoints of the first segment,
the second metric is at least partly the function of the same plurality of network parameters of the second segment, and
the one or more segment end points include one or more endpoints of the second segment; and
adding the first metric and the second metric to generate a third metric,
wherein the third metric is at least partly the function of the same plurality of one or more elementary network parameters of the network path,
the one or more segment end points include one or more endpoints of the network path, and
the third metric is a quality characterization of the same plurality of one or more applications.

24. The network system of claim 23, wherein the network device further performs:
prior to accessing the first or the second metric, generating at least one of the first metric and the second metric.

25. The network system of claim 23, wherein the network device further performs:
prior to accessing the first or the second metric, receiving at least one of the first metric and the second metric.

26. The network system of claim 23, wherein at least one of the plurality of one or more network parameters is dynamic.

27. The network system of claim 23, wherein at least one of the plurality of one or more network parameters is static.

28. The network system of claim 23, wherein the plurality of one or more network applications include at least one of UDP and TCP applications.

29. The network system of claim 28, wherein the plurality of one or more network applications include UDP applications.

30. The network system of claim 29, wherein the plurality of one or more network applications include voice.

31. The network system of claim 29, wherein the plurality of one or more network applications include video.

32. The network system of claim 31, wherein the plurality of one or more network applications include video conferencing.

33. The network system of claim 28, wherein the plurality of one or more network applications include TCP applications.

34. The network system of claim 33, wherein the plurality of one or more network applications include HTTP.

35. The network system of claim 34, wherein the plurality of one or more network applications include one of HTTP/1.0 and HTTP/1.1.

36. The network system of claim 33, wherein the plurality of one or more network applications include ftp.

37. The network system of claim 33, wherein the plurality of one or more network applications include telnet.

38. The network system of claim 23, wherein the plurality of one or more network parameters include delay.

39. The network system of claim 23, wherein the plurality of one or more network parameters include jitter.

40. The network system of claim 23, wherein the plurality of one or more network parameters include loss.

41. The network system of claim 23, wherein the plurality of one or more network parameters include currently available bandwidth.

42. The network system of claim 23, wherein the plurality of one or more network parameters include intrinsic bandwidth.

43. The network system of claim 23, wherein the first, second, and third metrics include non-performance related characteristics.

44. The network system of claim 43, wherein the non-performance related characteristics includes pre-specified route preferences.

45. The network system of claim 23, further comprising:
a plurality of one or more inputs adapted to be coupled to the network path; and
a plurality of one or more outputs coupled to the plurality of one or more inputs,
wherein responsive to a plurality of one or more packets arriving to the network device through the plurality of one or more inputs, the network device selects at least one output from the plurality of one or more outputs, and
the at least one output is determined at least partly using at least one of the first metric, second metric, and third metric.

46. The method of claim 1, wherein the function of the same plurality of one or more network parameters is a combination of multiple component functions, wherein each of the multiple component functions is tailored to measure a performance characteristic of a corresponding one of the one or more network parameters.

47. The method of claim 1, wherein the first metric and the second metric are both derived from mean opinion scores.

48. The method of claim 1, wherein modeling negative linear exponential equations comprises fitting curves corresponding to the quality characterizations.

49. The method of claim 1, wherein a single negative linear exponential equation models both voice and TCP traffic, and further wherein a parameter of the single negative linear exponential equation is derived from first and second parameters of negative linear exponential equations corresponding to voice and TCP traffic, respectively.

50. A method of characterizing a quality of a network path, including a first segment and a second segment, the method comprising:
using products of negative exponential functions for deriving first and second metrics, wherein deriving one of the negative linear exponential equations comprises determining, by a network device, a first parameter of the negative exponential equation corresponding to underestimating a quality characterization, determining, by the network device, a second parameter of the negative exponential equation corresponding to overestimating the corresponding quality characterization, and determining, by the network device, a third parameter from an average of the first and second parameters;
wherein the first and second metrics are at least in part quality characterizations of a same plurality of one or more network applications;
accessing the first metric and the second metric,
the quality characterization characterizes a quality of the same plurality of one or more network applications running at one or more segment end-points,
the first metric and the second metric are at least partly a function of a same plurality of one or more elementary network parameters whose individual performance is modeled using a negative exponential function,
the plurality of one or more network parameters include one or more of delay, jitter, loss, currently available bandwidth, and intrinsic bandwidth,
the first metric is at least partly the function of the same plurality of network parameters of the first segment,
the one or more segment end points include one or more endpoints of the first segment,
the second metric is at least partly the function of the same plurality of network parameters of the second segment, and
the one or more segment end points include one or more endpoints of the second segment; and
adding the first metric and the second metric to generate a third metric,
wherein the third metric is at least partly the function of the same plurality of one or more network parameters of the network path,
the one or more segment end points include one or more endpoints of the network path, and
the third metric is a quality characterization of the same plurality of one or more applications.

* * * * *